US012312075B2

(12) United States Patent
Long et al.

(10) Patent No.: US 12,312,075 B2
(45) Date of Patent: May 27, 2025

(54) BLADE PITCH COUPLED TO PROPULSION SYSTEM TILT

(71) Applicant: Wisk Aero LLC, Mountain View, CA (US)

(72) Inventors: Geoffrey Alan Long, Montara, CA (US); Chase Nichols, Kirkland, WA (US); Patrick Kelly, Clarksburg, CA (US)

(73) Assignee: Wisk Aero LLC, Mountain View, CA (US)

( * ) Notice: Subject to any disclaimer, the term of this patent is extended or adjusted under 35 U.S.C. 154(b) by 5 days.

(21) Appl. No.: 18/417,276

(22) Filed: Jan. 19, 2024

(65) Prior Publication Data
US 2024/0246670 A1 Jul. 25, 2024

Related U.S. Application Data

(60) Provisional application No. 63/440,054, filed on Jan. 19, 2023.

(51) Int. Cl.
B64C 29/00 (2006.01)
B64C 27/26 (2006.01)

(52) U.S. Cl.
CPC .......... B64C 29/0033 (2013.01); B64C 27/26 (2013.01)

(58) Field of Classification Search
CPC .. B64C 29/0033; B64C 27/605; B64D 35/026
See application file for complete search history.

(56) References Cited

U.S. PATENT DOCUMENTS

| 10,011,349 | B2 * | 7/2018 | Ivans ................... B64C 5/08 |
| 10,279,892 | B2 * | 5/2019 | Bosworth ............. B64C 3/385 |
| 10,640,207 | B2 * | 5/2020 | Lee ..................... B64D 35/04 |
| 11,820,499 | B1 * | 11/2023 | Beno ................... H02P 27/06 |
| 2004/0026563 | A1 | 2/2004 | Moller |
| 2011/0303795 | A1 | 12/2011 | Oliver |
| 2018/0155019 | A1 | 6/2018 | Lee et al. |
| 2019/0329882 | A1 | 10/2019 | Baity et al. |

OTHER PUBLICATIONS

PCT/US2024/012133, "International Search Report and Written Opinion", Apr. 5, 2024, 10 pages.

* cited by examiner

Primary Examiner — Brian M O'Hara
(74) Attorney, Agent, or Firm — Kilpatrick Townsend & Stockton LLP

(57) ABSTRACT

Embodiments provide mechanisms for coupling rotor blade pitch to propulsion system tilt angle in an aircraft, and more specifically in electric aircrafts. A system may include a tiltable propulsion system configured to move between a first tilt angle and a second tilt angle, wherein the tiltable propulsion system includes a plurality of rotor blades each configured to move between a first pitch position and a second pitch position; a tilting mechanism coupled to the tiltable propulsion system and configured to move the tiltable propulsion system between the first tilt angle and the second tilt angle; a pitching mechanism coupled to one or more of the plurality of rotor blades and configured to move one or more of the plurality of rotor blades between the first pitch position and the second pitch position; and an actuator configured to operate both the tilting mechanism and the pitching mechanism simultaneously.

19 Claims, 13 Drawing Sheets

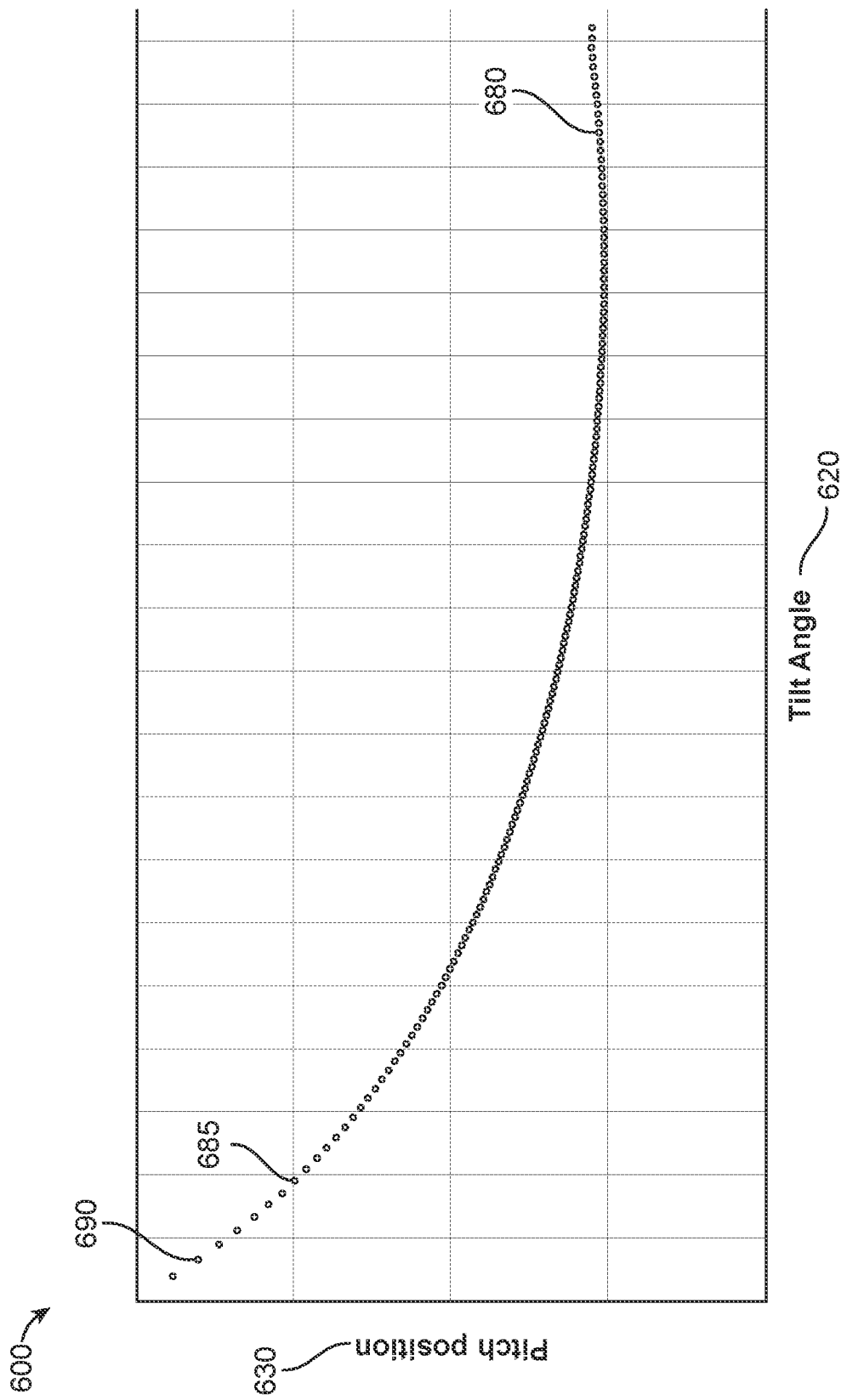

BLADE PITCH COUPLED TO PROPULSION SYSTEM TILT

CROSS-REFERENCES TO OTHER APPLICATIONS

This application claims benefit under 35 USC§ 119(e) to U.S. Provisional Patent Application No. 63/440,054 filed Jan. 19, 2023, and entitled "Blade Pitch Linked to Tilt," the disclosure of which is incorporated by reference herein in its entirety for all purposes.

FIELD

The described embodiments relate generally to an aircraft with vertical takeoff and landing capability. In particular, the embodiments provide an electric aircraft with one or more tiling propulsion systems.

BACKGROUND

Aircraft with tiltable propulsion systems typically include a tilting mechanism for tilting the propulsion system between different tilt angles. Some aircraft may include an additional mechanism dedicated to change a pitch of the rotor blades coupled of the tiltable propulsion system. While these mechanisms provide useful functions, each mechanism utilized involves adding extra actuators and control functions, thereby increasing components, weight, and complexity to the aircraft.

Embodiments address these and other problems, individually or collectively.

SUMMARY

Techniques disclosed herein relate generally to an aircraft including tiltable propulsion systems. More specifically, techniques disclosed herein provide mechanisms for coupling a pitch position of the rotor blades of the propulsion system to a tilt angle of the propulsion system. According to various embodiments, the electric aircraft may include an electric vertical take-off landing (VTOL) aircraft with a plurality of propulsion systems. One or more of the propulsion systems may be tiltable to provide thrust in various directions, such as a horizontal direction for forward flight and a vertical direction for vertical flight. Embodiments provide mechanisms for automatically changing the pitch of the rotor blades in response to a change in the tilt angle of the propulsion system. The pitch positions and tilt angle may be linked in any suitable manner, and in some embodiments, a single actuator can be used to control both pitch and tilt. Various inventive embodiments are described herein, including methods, processes, systems, devices, and the like.

Embodiments provide a system comprising a tiltable propulsion system configured to move between a first tilt angle and a second tilt angle, wherein the tiltable propulsion system includes a plurality of rotor blades each configured to move between a first pitch position and a second pitch position; a tilting mechanism coupled to the tiltable propulsion system and configured to move the tiltable propulsion system between the first tilt angle and the second tilt angle; a pitching mechanism coupled to one or more of the plurality of rotor blades and configured to move one or more of the plurality of rotor blades between the first pitch position and the second pitch position; and an actuator configured to operate both the tilting mechanism and the pitching mechanism simultaneously.

According to further embodiments, the system further includes coupling between the pitching mechanism and the tilting mechanism such that movement of the tiltable propulsion system by the tilting mechanism causes a corresponding movement of one or more of the plurality of rotor blades by the pitching mechanism.

According to further embodiments, the coupling between the pitching mechanism and the tilting mechanism is configured such that each tilt angle of the tiltable propulsion system causes a pitch position for one or more of the plurality of rotor blades.

According to further embodiments, the first tilt angle causes the first pitch position, and the second tilt angle causes the second pitch position.

According to further embodiments, the pitching mechanism moves one or more of the plurality of rotor blades between the first pitch position and the second pitch position as the tilting mechanism moves the tiltable propulsion system between the first tilt angle and the second tilt angle.

According to further embodiments, the coupling between the pitching mechanism and the tilting mechanism is configured to provide a non-linear relationship between the tilt angle of the tiltable propulsion system and a pitch position of one or more of the plurality of rotor blades.

According to further embodiments, the non-linear relationship causes a relatively smaller change in the pitch position of one or more of the plurality of rotor blades in response to change in the tilt angle when the tiltable propulsion system is set to the first tilt angle, and wherein the non-linear relationship causes a relatively larger change in the pitch position of one or more of the plurality of rotor blades in response to a change in the tilt angle when the tiltable propulsion system is set to the second tilt angle.

According to further embodiments, the system further includes a coupling mechanism configured to provide the coupling between the pitching mechanism and the tilting mechanism, wherein the coupling mechanism is configured to convert a tilting motion caused by the tilting mechanism into a linear motion at the pitching mechanism, and wherein the pitching mechanism is configured to convert the linear motion into a rotational motion at one or more of the plurality of rotor blades.

According to further embodiments, the system further includes a support structure, the tiltable propulsion system being coupled to the support structure, wherein the coupling mechanism is connected to the support structure and the tiltable propulsion system.

According to further embodiments, the coupling mechanism is not directly connected to the tilting mechanism.

According to further embodiments, the coupling mechanism includes a first pivot point that is offset from a second pivot point of the tilting mechanism.

According to further embodiments, the coupling mechanism includes a four-bar crank slider, and the pitching mechanism includes a slider coupled to the four-bar crank slider.

According to further embodiments, the actuator is a component of the tilting mechanism, and wherein the pitching mechanism is coupled to the tilting mechanism.

According to further embodiments, the pitching mechanism does not include a separate dedicated actuator.

According to further embodiments, the first tilt angle corresponds to a vertical flight configuration, the second tilt angle corresponds to a forward flight configuration.

According to further embodiments, the system further includes an aircraft including a fuselage; a pair of wings coupled to opposite sides the fuselage; and the tiltable propulsion system, wherein the tiltable propulsion system is coupled to a first wing of the pair of wings.

According to further embodiments, the system further includes a control system configured to control the tilting mechanism and the pitching mechanism through the actuator, and configured to: operate the tilting mechanism to gradually move the tiltable propulsion system from the first tilt angle through a set of intermediary tilt angles to a third tilt angle; operate the tilting mechanism to, upon reaching the third tilt angle, pause movement the tiltable propulsion system; and after the aircraft reaches a predetermined speed or a predetermined altitude, operate the tilting mechanism to move the tiltable propulsion system from the third tilt angle to the second tilt angle.

According to further embodiments, the first tilt angle corresponds to a vertical flight configuration, the second tilt angle corresponds to a forward flight configuration, and the third tilt angle is within 10 degrees of the second tilt angle.

According to further embodiments, the system further includes a coupling between the pitching mechanism and the tilting mechanism configured such that each tilt angle of the tiltable propulsion system causes a corresponding pitch position for one or more of the plurality of rotor blades, wherein the first tilt angle causes the first pitch position, the second tilt angle causes the second pitch position, the third tilt angle causes a third pitch position, wherein the third pitch position is at least 3 degrees less than the second pitch position.

According to further embodiments, the first pitch position corresponds to an acceleration pitch, and the second pitch position corresponds to an efficiency pitch.

Further details regarding embodiments of the invention can be found in the Detailed Description and the Figures.

BRIEF DESCRIPTION OF THE DRAWINGS

Various embodiments of the invention are disclosed in the following detailed description and the accompanying drawings. In the appended figures, similar components or features may have the same reference label. Further, various components of the same or similar type may be distinguished by following the reference label by a dash and a second label that distinguishes among the similar components.

FIG. 6 illustrates a chart with an example of a non-linear relationship between tilt angle and pitch position, according to embodiments.

DETAILED DESCRIPTION

Techniques disclosed herein relate generally to an aircraft including tiltable propulsion systems. More specifically, techniques disclosed herein provide mechanisms for coupling a pitch position of the rotor blades of the propulsion system to a tilt angle of the propulsion system. According to various embodiments, the electric aircraft may include an electric vertical take-off landing (VTOL) aircraft with a plurality of propulsion systems. One or more of the propulsion systems may be tiltable to provide thrust in various directions, such as a horizontal direction for forward flight and a vertical direction for vertical flight. Embodiments provide mechanisms for automatically changing the pitch of the rotor blades in response to a change in the tilt angle of the propulsion system. The pitch positions and tilt angle may be linked in any suitable manner, and in some embodiments, a single actuator can be used to control both pitch and tilt. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Figure 1A:
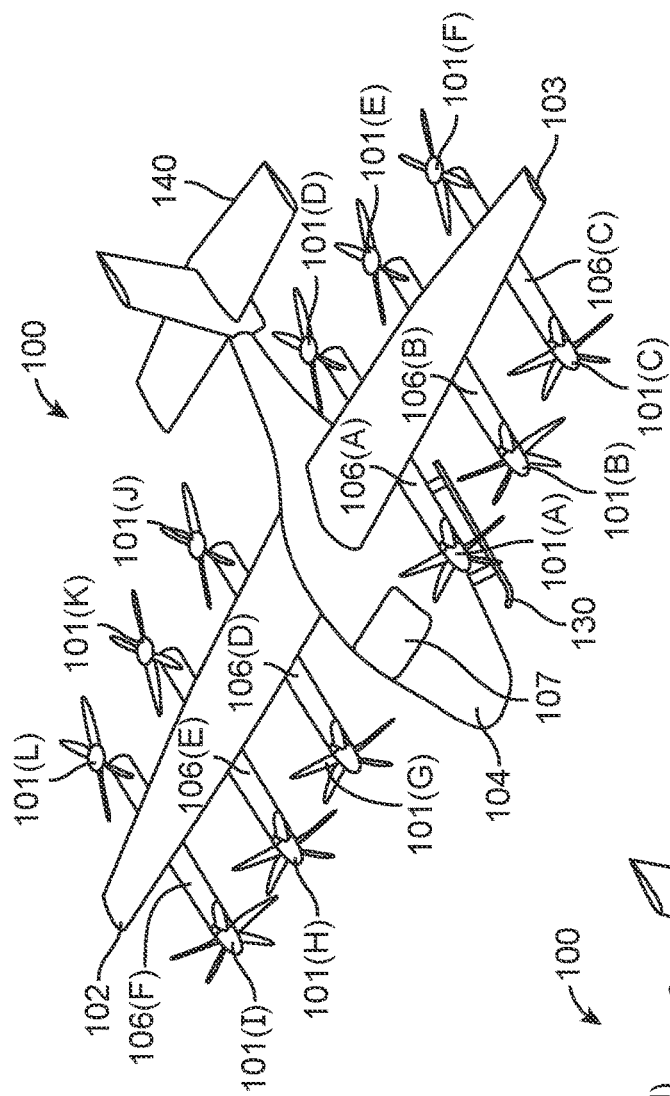
FIGS. 1A-1B depict planar views an exemplary aircraft with tilting fans in forward and vertical configurations, respectively, according to embodiments.
Figure 1B:
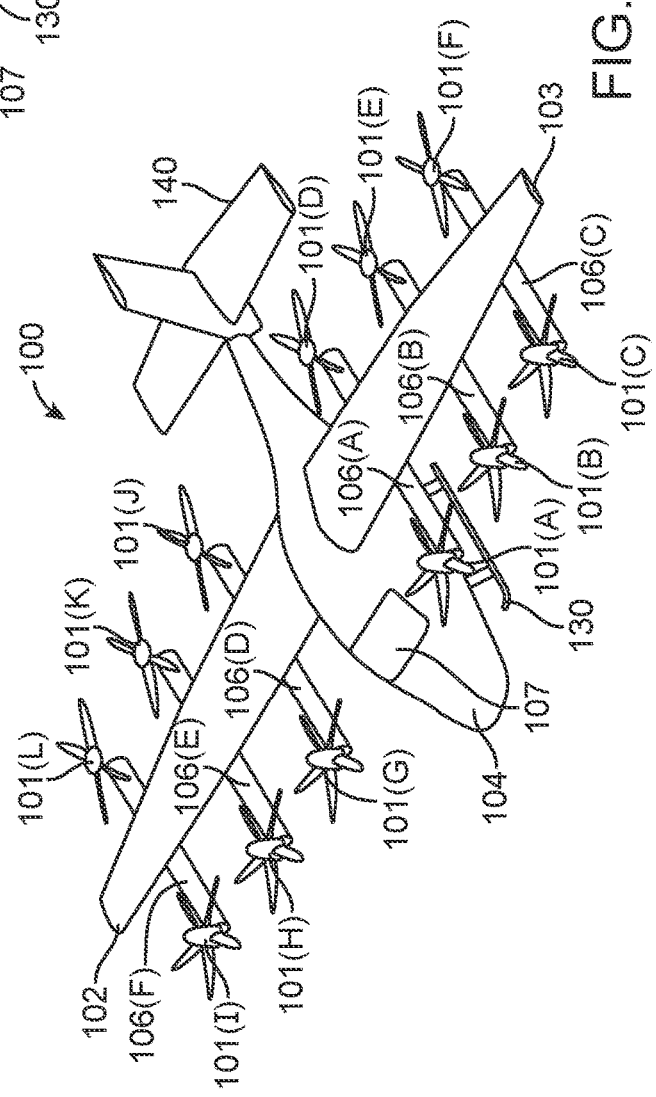

FIGS. 1A and 1B depict planar views of an exemplary aircraft 100, according to embodiments. The aircraft 100 can be any suitable type of flying vehicle, such as an airplane, a helicopter, a drone or a hybrid-type flying vehicle. In some embodiments, the aircraft 100 may be capable of vertical take-off and landing (VTOL). The aircraft 100 can be configured for human piloting, remote piloting, and/or autonomous flight.

In the example shown, aircraft 100 includes a fuselage 104 that may include a cabin section (e.g., toward the nose) for carrying passengers and/or cargo. A pair of wings including a first wing 102 and a second wing 103 can be mounted on or otherwise attached to the fuselage 104. The pair of wings can be coupled to opposite sides of the fuselage, and can take any suitable shape and configuration. For example, the pair of wings can be rectangular straight wings, tapered straight wings, rounded or elliptical straight wings, swept wings, delta wings, or any other suitable type of wing. In some embodiments, the first wing 102 and the second wing 103 may be coupled to the fuselage 104 in a high-wing configuration. That is, the first wing 102 and the second wing 103 may be mounted on an upper portion of the fuselage 104, as shown in FIGS. 1A-1B.

The aircraft 100 can also include support structures 106 (A)-(F), which may be coupled to the wings 102, 103. As shown in FIGS. 1A-1B, each of the support structures 106(A)-(F) may take the form of a boom, though embodiments include any other suitable structure. Six support structures 106(A)-(F) are shown in FIGS. 1A-1B, where three support structures 106(A)-(F) are provided under each of the pair of wings 102, 103. The support structures 106(A)-(F) may be coupled to the undersides of the pair of wings, and may include a forward portion extending forward beyond the wing and an aft portion extending aft of the wing.

In some embodiments, each of the support structures 106(A)-(F) are identical, and therefore the support structures 106(A)-(F) may be interchangeable between the positions on the wings. For example, a first support structure 106(A) closer to the fuselage may be interchangeable with an adjacent second support structure 106(B) (e.g., the middle boom on the wing) or a further third support structure 106(C) (e.g., the boom furthest away from the fuselage).

Propulsion Systems

The aircraft 100 can also include propulsion systems 101(A)-(L). While twelve propulsion systems 101(A)-(L) are shown in FIGS. 1A-1B, any suitable number of propulsion systems 101(A)-(L) can be included. The propulsion systems 101(A)-(L) may be coupled to the pair of wings 102, 103, and may be divided equally between the wings. In some embodiments, as shown in FIGS. 1A-1B, one or more of the propulsion systems 101(A)-(L) may be mounted on the support structures 106(A)-(F). For example, pairs of propulsion systems 101(A)-(L) may be mounted on opposite ends of a respective support structure 106(A)-(F), with one propulsion system mounted forward of the wing and another propulsion system mounted aft of the wing. In other embodiments, one or more of the propulsion systems 101(A)-(L) may be coupled directly to the wings. The number of booms and/or propulsion systems may vary according to the flight needs and requirements of the aircraft 100.

According to various embodiments, each of the propulsion systems 101(A)-(L) may be configured to provide thrust to the aircraft 100. The thrust from one or more of the propulsion systems 101(A)-(L) can be used to move, control, and/or stabilize the aircraft 100. The propulsion systems 101(A)-(L) can take the form of any suitable mechanism for providing thrust. In one example, a propulsion system may include a rotor (e.g., a fan). A propulsion system can also include a drive mechanism for the rotor, such as a dedicated electric motor (e.g., in the case of electric vehicles).

A rotor may comprise any suitable number of rotor blades (e.g., 2 blades, 3 blades, 4 blades, 5 blades, 6 blades, 7 blades, or 8 blades). The rotor blades may have a predetermined pitch or a predetermined angle of attack. In some embodiments, all rotor blades may have the same pitch or the same angle of attack. In other embodiments, at least two rotor blades may have different pitches or angles of attack than each other. The rotor blades may be spaced equally or unequally. The rotor may further comprise a hub. The rotor blades may be attached to the hub. In some embodiments, the rotor blades and an integral hub may be manufactured as a single piece. The hub provides a central structure to which the rotor blades connect, and in some embodiments is made in a shape that envelops the motor.

In some embodiments the motor parts are low-profile so that the entire motor fits within the hub of the rotor, presenting lower resistance to the air flow when flying forward. The rotor can be attached to the rotating part of the motor. The stationary part of the motor can be attached to a support structure. In some embodiments the motor can be a permanent magnet motor and can be controlled by an electronic motor controller. The electronic motor controller can send electrical currents to the motor in a precise sequence to allow the rotor to turn at a desired speed or with a desired torque.

Propulsion System Orientation—Vertical

According to various embodiments, one or more of the propulsion systems 101(A)-(L) may be positioned, oriented, and/or otherwise configured to provide thrust and/or movement to the aircraft 100 in a predefined direction. For example, one or more of the propulsion systems 101(A)-(L) may be configured to provide thrust upward in a vertical direction. As shown in FIG. 1A, these can include propulsion systems 101(D), 101(E), 101(F), 101(J), 101(K), and/or 101(L). Propulsion systems that are configured to provide thrust in a vertical direction may also be referred to as vertical fans or lift fans, or may be referred to as propulsion systems having a lift orientation or a hover orientation. Vertical fans may be used to generate vertical thrust (e.g., lift) for taking off, landing, hovering, stabilizing, and/or controlling the aircraft 100.

A vertical direction may be defined relative to the body of the aircraft 100. For example, a vertical direction can be the aircraft's vertical axis or z-axis (e.g., the plumb line that intersects the zenith and is orthogonal to the ground when the aircraft 100 is on the ground at rest, or hovering just above the ground). In some embodiments, the vertical direction may be orthogonal to the ground when the aircraft 100 is on the ground at rest and/or in a stable hover just above the ground in a level orientation. If the aircraft 100 is tilted, the aircraft's z-axis (and the vertical direction) may no longer be orthogonal to the ground. Vertical thrust may be thrust in a vertical direction (e.g., up or down).

Vertical thrust can be achieved by installing the vertical fans and/or their corresponding support structures 106(A)-(F) so that the rotational axis of each of the vertical fans is parallel with the vertical direction and/or orthogonal to a direction of forward flight. In other words, the vertical fans may be oriented such that their rotor blades rotate within a horizontal plane (e.g., a plane that is horizontal relative to the fuselage, or a plane defined by the x-axis and y-axis of the aircraft 100) and about the vertical axis (e.g., the z-axis of the aircraft 100). In some embodiments, the vertical fans may be configured so that each set of rotor blades rotate within the same plane. In other embodiments, the vertical fans may be configured so that one or more of the sets of rotor blades rotate within different planes (e.g., parallel planes).

In other embodiments, some or all of the vertical fans are oriented at an angle, so that on an individual level, one or more vertical fans have rotor blades that do not rotate within a horizontal plane, and do not provide thrust that is completely vertical, but instead provide thrust in a direction that is angled relative to vertical. However, in combination, a set of angled vertical fans can together provide a net thrust in the vertical direction. For example, a non-vertical thrust component provided by an angled vertical fan on the first wing 102 can be counteracted by an equal and opposite non-vertical thrust component provided by an oppositely angled vertical fan on the second wing 103.

In some embodiments, two adjacent vertical fans may have their blades mounted with opposite angles of attack such that their rotor blades spin in opposite directions. Adjacent vertical fans may refer to two vertical fans (e.g., 101A and 101D) that are coupled to opposite ends of the same support structure 106(A), or two vertical fans (e.g., 101A and 101B) that are on different support structures, or two vertical fans (e.g., 101A and 101G) that are on different wings.

According to various embodiments, a first subset of vertical fans may spin in a first direction, and a second subset (e.g., remainder) of vertical fans may spin in a second direction, opposite to the first direction. Configuring the vertical fans so that some spin in a first direction and other spin in an opposite second direction can advantageously cancel out any angular momentum created by the spinning blades so that the aircraft 100 can hover in a stable manner without rotating.

Further, rotational movement about the vertical axis of the aircraft 100 (e.g., yaw) can be performed when desired by temporarily reducing the spin rotational rate of some or all a first subset of vertical fans spinning in a first direction, and/or by temporarily increasing the spin rotational rate of a second subset of the vertical fans spinning in a second direction so that the total angular momentum created by the spinning blades does not cancel out. Accordingly, the aircraft 100 can rotate with the use of vertical fans without needing another source of thrust oriented in another direction.

Propulsion System Orientation—Horizontal

According to various embodiments, one or more of the propulsion systems 101(A)-(L) may be configured to provide thrust forward in a horizontal direction. As shown in FIG. 1A, these can include propulsion systems 101(A), 101(B), 101(C), 101(G), 101(H) and/or 101(I). Propulsion systems that are configured to provide thrust in a horizontal direction may also be referred to as horizontal fans or propellers, or may be referred to as propulsion systems having a forward flight orientation. Horizontal fans may be used to provide horizontal thrust for forward flight, climb, descent, and/or cruise. As shown in FIGS. 1A-1B, two propulsion systems of the same type (e.g., two vertical fans) or of different types (e.g., one vertical fan and one horizontal fan) can be mounted on each of the support structures 106(A)-(F).

A horizontal direction may be defined relative to the body of the aircraft 100. For example, a horizontal direction can be the aircraft's forward axis or x-axis. In some embodiments, the horizontal direction may be parallel to the ground when the aircraft 100 is on the ground at rest, in a stable hover just above the ground in a level orientation, and/or in a forward flight condition. If the aircraft 100 is tilted, the aircraft's x-axis (and the horizontal direction) may no longer be parallel to the ground. Horizontal thrust may be thrust in a horizontal direction (e.g., forward or backward).

Horizontal thrust (e.g., forward thrust) can be achieved by installing the horizontal fans and/or their corresponding support structures 106(A)-(F) so that the rotational axis of each of the horizontal fans is parallel with the horizontal direction and/or parallel to a direction of forward flight. In other words, the horizontal fans may be oriented such that their rotor blades rotate within a vertical plane (e.g., a plane defined by the z-axis and y-axis of the aircraft 100) and about the forward axis (e.g., the x-axis of the aircraft 100). In some embodiments, the horizontal fans may be configured so that each set of rotor blades rotate within the same plane. In other embodiments, the horizontal fans may be configured so that one or more of the sets of rotor blades rotate within different parallel planes.

In some embodiments, the horizontal fans may be configured to have the capability of spinning in either direction. As a result, the horizontal fans may be able provide a reverse thrust. A reverse thrust can be useful for moving the aircraft 100 in a backward direction (e.g., backing out of a hangar area from a hover position). Additionally, a reverse thrust can be used to reduce forward flight velocity. For example, reverse thrust from the horizontal fans can be used in instead of, or in addition to, flaps to slow the aircraft 100 and/or bring the aircraft 100 to a stationary hover.

In some embodiments, the horizontal direction and the vertical direction may be orthogonal to one another. Accordingly, vertical fans and horizontal fans may provide thrust in substantially orthogonal directions. In other embodiments, the vertical fans and horizontal fans may provide thrust that is about orthogonal or nearly orthogonal, but not exactly orthogonal. Isolating the directional thrusts into two separate types of components can beneficially simplify the control and design of the aircraft 100. In some embodiments, the horizontal fans and the vertical fans can be operated, powered on, and otherwise controlled independently from one another, thereby allowing thrust to be applied independently in the orthogonal directions (e.g., thrust can be applied in the different directions at the same time and at different times).

A combination of the horizontal fans and wings 102, 103 may achieve both forward movement and lift. In some embodiments, it may be more efficient to utilize the horizontal fans and wings 102, 103 to achieve vertical lift, instead of the vertical fans. Once the aircraft 100 reaches a sufficient speed (e.g., predetermined amount of speed, or a cruising speed) so that the wings provide sufficient lift to the aircraft 100, the vertical fans may no longer be needed to provide lift, and the vertical fans may temporarily stop operating. For example, the vertical fans may initially be active and generate vertical thrust to lift the aircraft 100. Once the aircraft 100 is off the ground and/or at a certain height, the horizontal fans can activate and/or increase the horizontal thrust so that the aircraft 100 gains horizontal velocity. The vertical fans may continue providing vertical lift while horizontal velocity increases, as the wings 102, 103 may not provide sufficient vertical lift until a predetermined speed (e.g., a cruising speed) is achieved. The vertical fans may eventually (or gradually) reduce their vertical thrust contribution as the wings 102, 103 gradually provide more (e.g., an increasing amount of) vertical lift during the increasing horizontal velocity. Later on, as the aircraft 100 slows or returns to a hover position, the vertical fans can reactivate and/or increase vertical thrust.

Propulsion System Orientation—Fixed

According to various embodiments, one or more of the propulsion systems 101(A)-(L) may have a fixed orientation. For example, one or more of the propulsion systems 101(A)-(L) may be mounted in a fixed orientation relative to a respective wing 102 or 103, a respective support structure 106(A)-(F), and/or the aircraft 100. While the rotor blades of a fixed propulsion system can rotate when activated, the orientation of the propulsion system housing and structure may not be rotatable with respect to the aircraft 100. As a result, a fixed propulsion system can be configured to provide thrust in a constant direction relative to the aircraft 100. The thrust direction and orientation of a fixed propulsion system relative to the aircraft 100 (e.g., the fuselage, wings, and/or support structures) may not change or move, regardless of the current aircraft 100 activities and/or direction of movement (e.g., both forward flight and vertical flight), according to embodiments.

In some embodiments, one or more vertical fans may have fixed orientations. For example, one or more of propulsion systems 101(D), 101(E), 101(F), 101(J), 101(K), and/or 101(L) may have fixed vertical orientations. These may be referred to as fixed vertical fans.

Further, according to some embodiments, one or more of the horizontal fans may have fixed orientations. For example, propulsion systems 101(A), 101(B), 101(C), 101(G), 101(H) and/or 101(I) may have fixed horizontal orientations. These may be referred to as fixed horizontal fans.

In some embodiments, all of the propulsion systems 101(A)-(L) may have fixed orientations. As a result, the vertical fans and the horizontal fans may be permanently configured to provide thrust in orthogonal (or substantially orthogonal) directions.

Propulsion System Orientation—Tiltable

In other embodiments, one or more of the propulsion systems 101(A)-(L) may be configured to change orientation. For example, one or more of the propulsion systems 101(A)-(L) may be configured and/or mounted in a manner that allows the angle and orientation to be tiltable relative to a respective wing 102 or 103, a respective support structure 106(A)-(F), and/or the aircraft 100. As a result, a tilting propulsion system, which may also be referred to as a tiltable propulsion system or a tilting fan, can be configured to provide thrust in more than one direction relative to the aircraft 100.

A tilting fan may be coupled to a respective support structure 106(A)-(F) via one or more tilting mechanisms including, for example, a motor and a coupling mechanism. A tilting mechanism can include one or more components that are coupled to the tilting fan and the respective support structure 106(A)-(F), which can thereby enable relative position and angle changes between the tilting fan and the respective support structure 106(A)-(F). The tilting mechanism may be controllable and/or configured to change or move the orientation and thrust direction of a tilting fan relative to the aircraft 100 (e.g., the fuselage, wings, and/or support structures) based on current aircraft 100 activities, needs, and/or direction of movement (e.g., forward flight, vertical flight), according to embodiments. The entire tilting fan assembly, including a spinner and a set of rotor blades, may all tilt together.

As discussed above, propulsion systems 101(A), 101(B), 101(C), 101(G), 101(H) and/or 101(I) may take the form of fixed horizontal fans. However, in other embodiments, one or more of propulsion systems 101(A), 101(B), 101(C), 101(G), 101(H) and/or 101(I) may instead take the form of tilting fans. Such tilting fans may be configured to switch (e.g., rotate or tilt) between a horizontal orientation and a vertical orientation. Horizontal orientation can also be referred to as horizontal direction, forward flight configuration, second tilt configuration, and/or second tilt angle. Vertical orientation can also be referred to as vertical direction, vertical flight configuration, first tilt configuration, and/or first tilt angle. FIG. 1A illustrates the tilting fans as currently set to a forward flight configuration (also referred to as a second tilt configuration or a second tilt angle). FIG. 1B illustrates the tilting fans as currently set to a vertical flight configuration (also referred to as a first tilt configuration or first tilt angle).

As shown in FIG. 1B, all of the propulsion systems 101(A)-(L) may have a vertical orientation. Some of these may be vertical fans with a fixed vertical orientation (e.g., propulsion systems in the back row locations at 101(D), 101(E), 101(F), 101(J), 101(K), and/or 101(L)), while others may be tilting fans that are currently and temporarily set to have a vertical orientation or a vertical flight configuration (e.g., propulsion systems in the front row locations at 101(A), 101(B), 101(C), 101(G), 101(H) and/or 101(I)). The tilting fans may have an orientation that is the same as or similar to that of the vertical fans. FIG. 1A illustrates the tilting fans (e.g., propulsion systems in the front row locations at 101(A), 101(B), 101(C), 101(G), 101(H) and/or 101(I)) in a forward flight configuration.

Figure 2A:
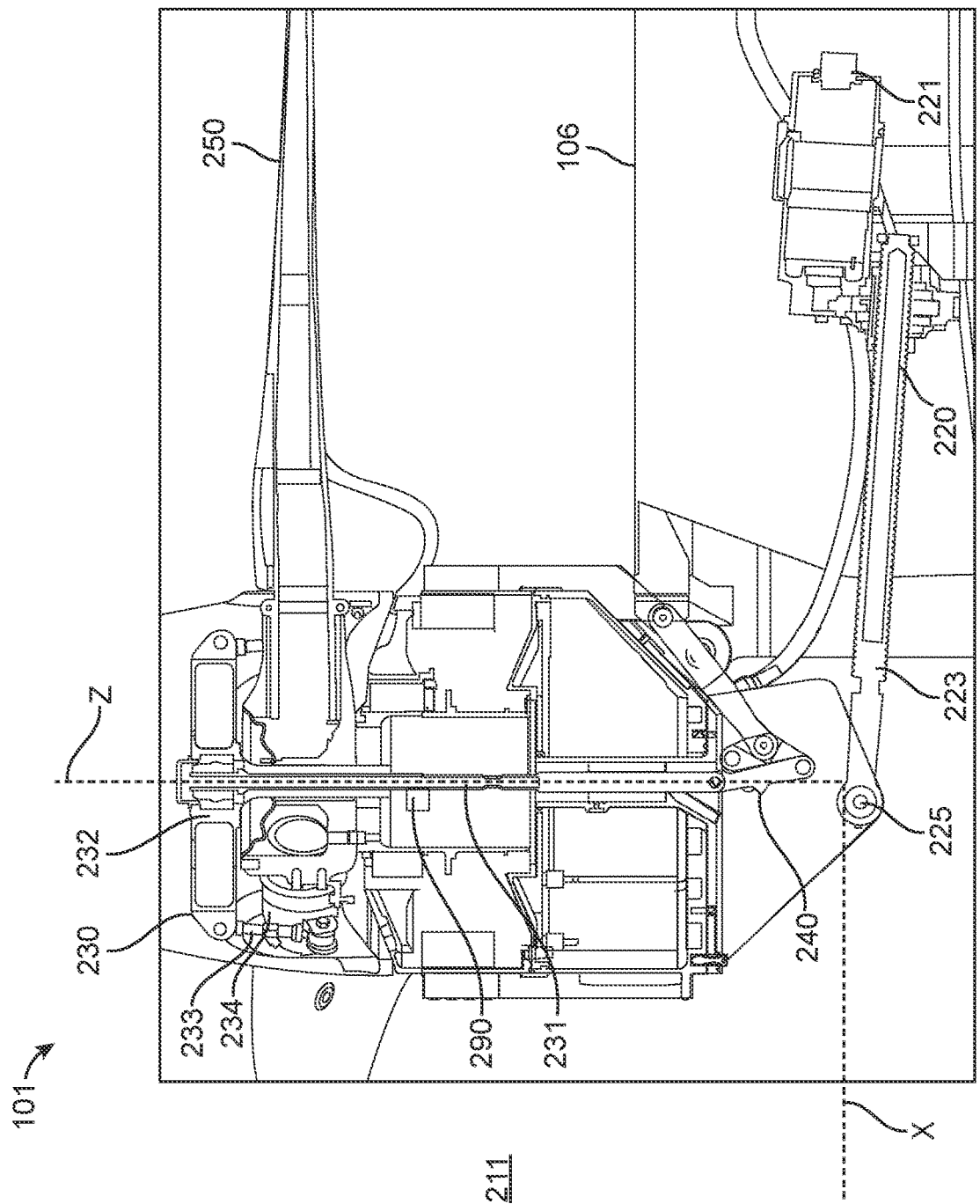
FIGS. 2A-2B illustrate an example of a propulsion system with a pitching mechanism coupled to a tilting mechanism, according to embodiments.
Figure 2B:
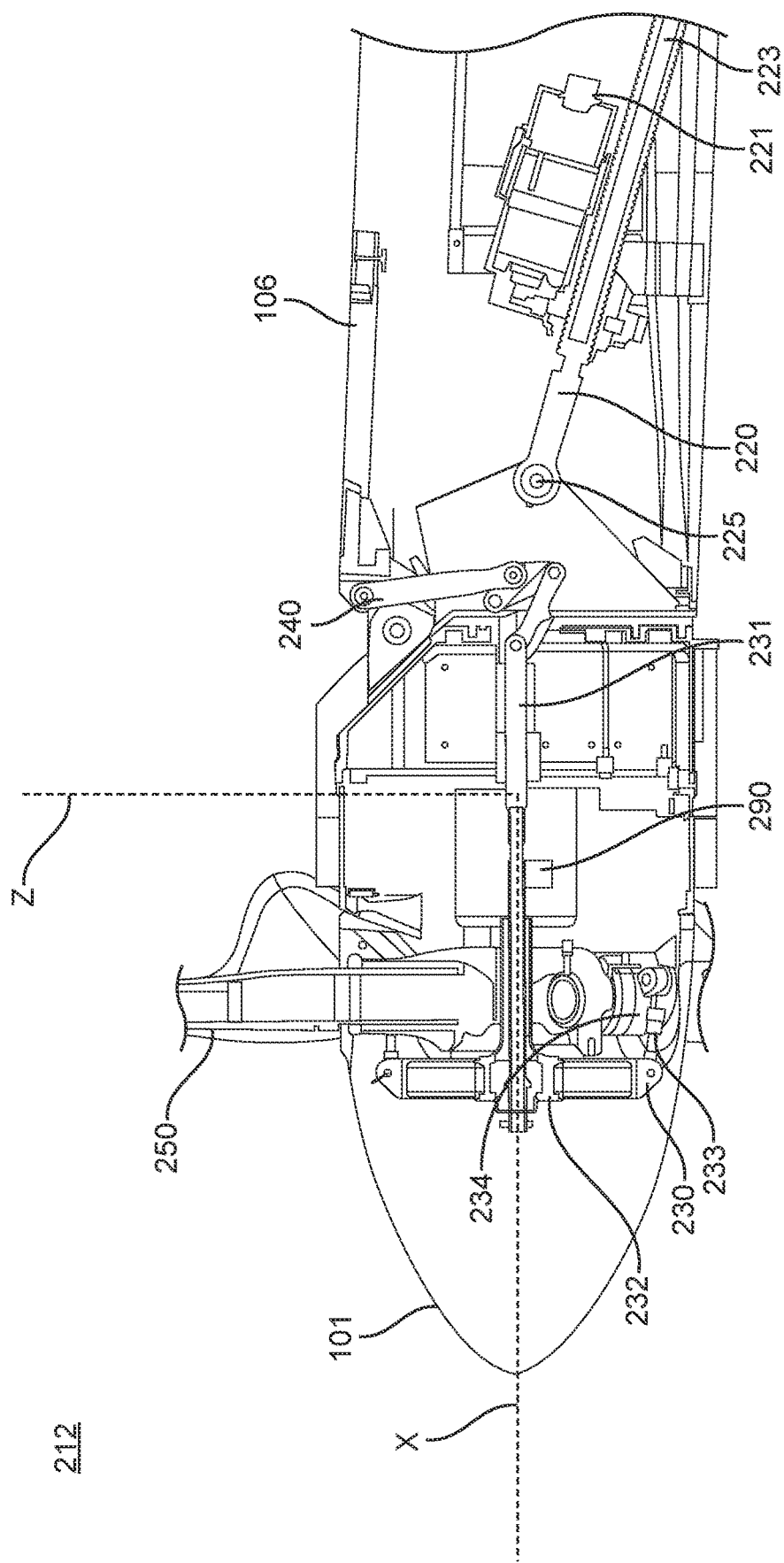

FIGS. 2A-2B illustrate a closer view of a propulsion system 101 that is configured to tilt. The propulsion system 101 (also referred to as a tilting fan) may be configured to tilt through a predefined range of tilt configurations, which can include the vertical flight configuration 211 as illustrated in FIG. 2A, the forward flight configuration 212 as illustrated in FIG. 2B, and/or any other suitable number of intermediary tilt angles between the vertical flight configuration 211 (e.g., 90 degrees, or about 90 degrees) and the forward flight configuration 212 (e.g., 0 degrees, or about 0 degrees).

The propulsion system 101 can be controlled to switch between the tilt configurations to provide additional thrust in any suitable direction, depending on current movement needs of aircraft. For example, during takeoff, landing, and/or hovering, the propulsion system 101 may be set to the vertical flight configuration 211 to provide additional vertical thrust. During forward cruising flight, the propulsion system 101 may be set to the forward flight configuration 212 to provide horizontal thrust. During stages of forward acceleration, deceleration, altitude gaining, and/or altitude decreasing, the propulsion system 101 may be set to an intermediary tilt angle and configuration to provide both a horizontal thrust component and a vertical thrust component.

According to embodiments, the propulsion system 101 may be gradually tilted, iteratively tilted, or otherwise pass through multiple different intermediary tilt angles based on the stage of flight and/or aircraft needs. For example, during forward acceleration and/or an altitude gaining stage of flight, the propulsion system 101 can gradually tilt (e.g., 0.5 degrees at a time, 1 degree at a time, etc.) from vertical toward horizontal as speed is gained and/or altitude is gained.

In some embodiments, the vertical flight configuration 211 may be a maximum tilt, and the forward flight configuration 212 may be a minimum tilt of the propulsion system 101. In other embodiments, the propulsion system 101 may be capable of tilt angles and configurations beyond the vertical flight configuration 211 (e.g., angled past vertical so that there is a reverse horizontal component) and/or tilt angles and configurations lower than the forward flight configuration 212 (e.g., angled below horizontal so that there is a downward component).

Referring back to FIG. 1, embodiments allow the aircraft 100 to include any suitable combination and number of tilting fans, fixed horizontal fans, and/or fixed vertical fans. Also, each type of fan can be located at any suitable position along the wings 102, 103 and/or at any suitable support structure 106(A)-(F). The type of propulsion system at each location may be selected to enhance any number of flight characteristics including forward thrust, vertical thrust, maneuverability, drag, and/or any suitable flight characteristic.

While tilting fans can provide the ability to increase thrust in a specific direction as desired, it can be beneficial to incorporate one or more propulsion systems with fixed orientations in order to reduce weight, reduce moving parts, reduce possible failure points, and/or reduce maintenance concerns.

Propeller Blade Pitch

A rotor blade (also referred to as a propeller blade) of a propulsion system 101 can be configured to have a certain blade pitch. The blade pitch of a rotor blade refers to the angle between the blade chord line and one of a spinner of the propulsion system, the aircraft body, or a plane of rotation of the propeller. Blade pitch can be described as a ratio of forward distance per rotation, assuming no slip. Typically, a low pitch (also referred to as fine pitch) yields good low speed acceleration and climb rate in an aircraft, while high pitch (also referred to as coarse pitch) optimizes high speed performance and fuel economy.

According to embodiments, one or more rotor blades of a propulsion system 101 may have adjustable pitch settings (also referred to as variable pitch positions). Such a propulsion system may be referred to as a variable pitch propeller. In a variable pitch propeller, the blade pitch of one or more rotor blades may be adjusted during flight. The blade pitch can thus be adjusted to optimize for thrust and/or efficiency based on a phase of flight, such as takeoff, climb or cruise. For example, a fine pitch setting, which may provide greater thrust, may be used during take-off, acceleration, gaining altitude, and/or landing. A coarser pitch, which may provide better efficiency, may be used for high-speed cruise flight. An example of a low pitch used during take-off is about 15 degrees. An example of a high pitch used during cruise flight is about 40 degrees.

The amount of thrust produced by a rotor blade is dependent on the speed and the angle of attack of the rotor blade. The effective angle of attack of the rotor blade may decrease as airspeed increases. To maintain a constant effective angle of attack or otherwise optimum effective angle of attack, the blade pitch may be increased.

Any suitable mechanisms can be included to enable pitch adjustments. For example, a rotor blade may be coupled to a respective spinner via one or more pitching mechanisms including, for example, a motor and a coupling mechanism. A pitching mechanism may be controllable and/or configured to change or move the pitch position of a rotor blade relative to the spinner (or other parts of the propulsion system) based on current aircraft 100 activities, needs, and/or direction of movement (e.g., forward flight, vertical flight), according to embodiments. As discussed in more detail below, in some embodiments, a pitching mechanism can be coupled to and/or combined with a tilting mechanism.

Figure 3B:
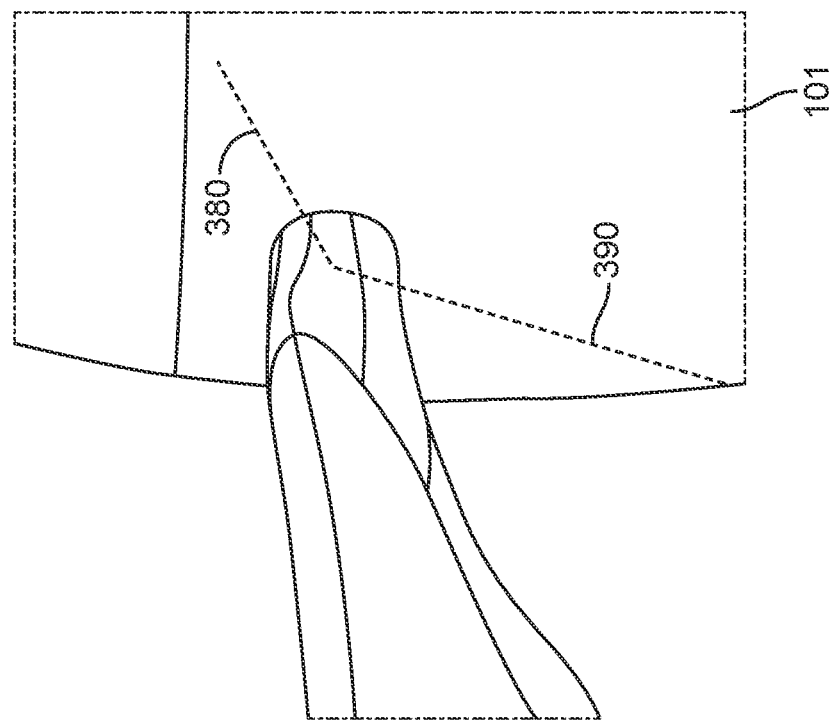
FIGS. 3A-3B illustrate two different rotor blade pitch positions, according to various embodiments.
Figure 3A:
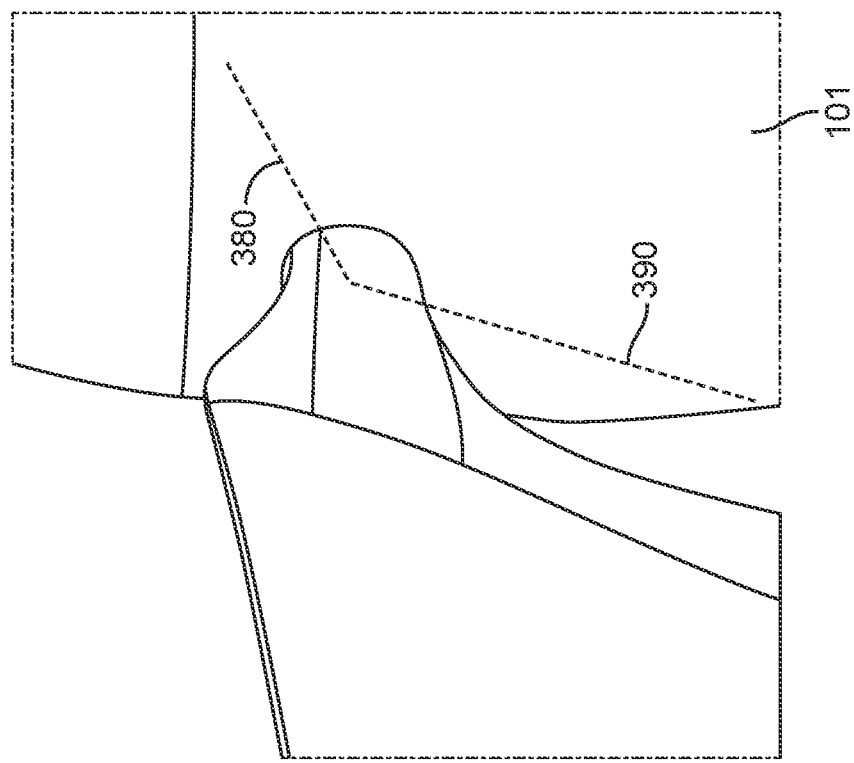
Figure 4A:
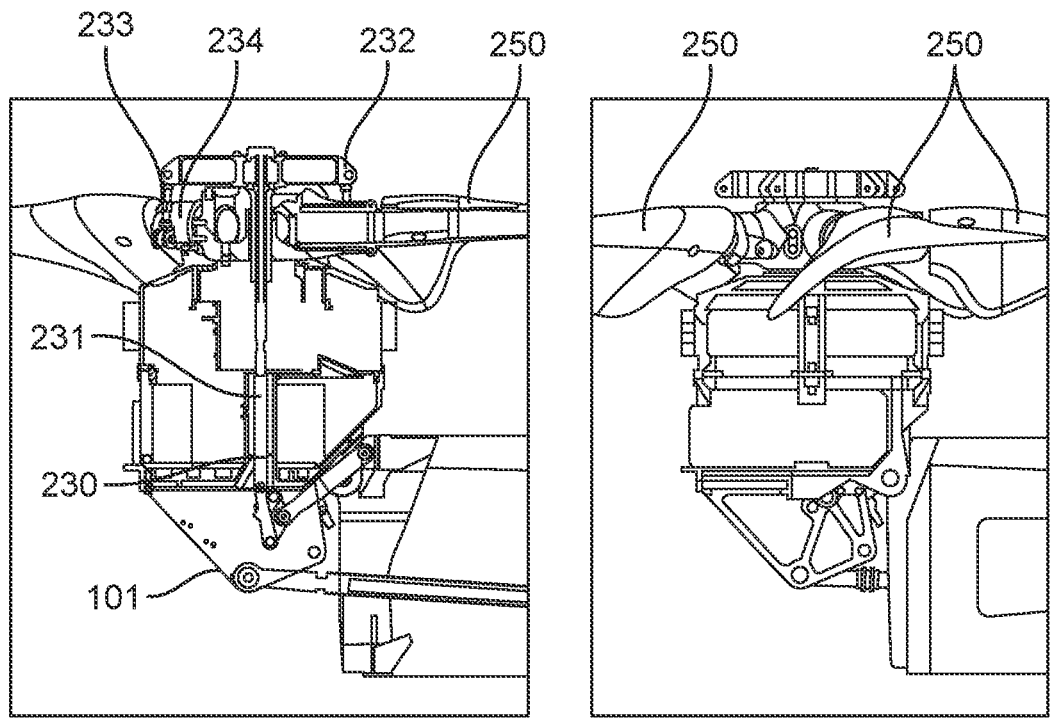
FIGS. 4A-4D illustrate an example of movement of a pitching mechanism, according to various embodiments.
Figure 4B:
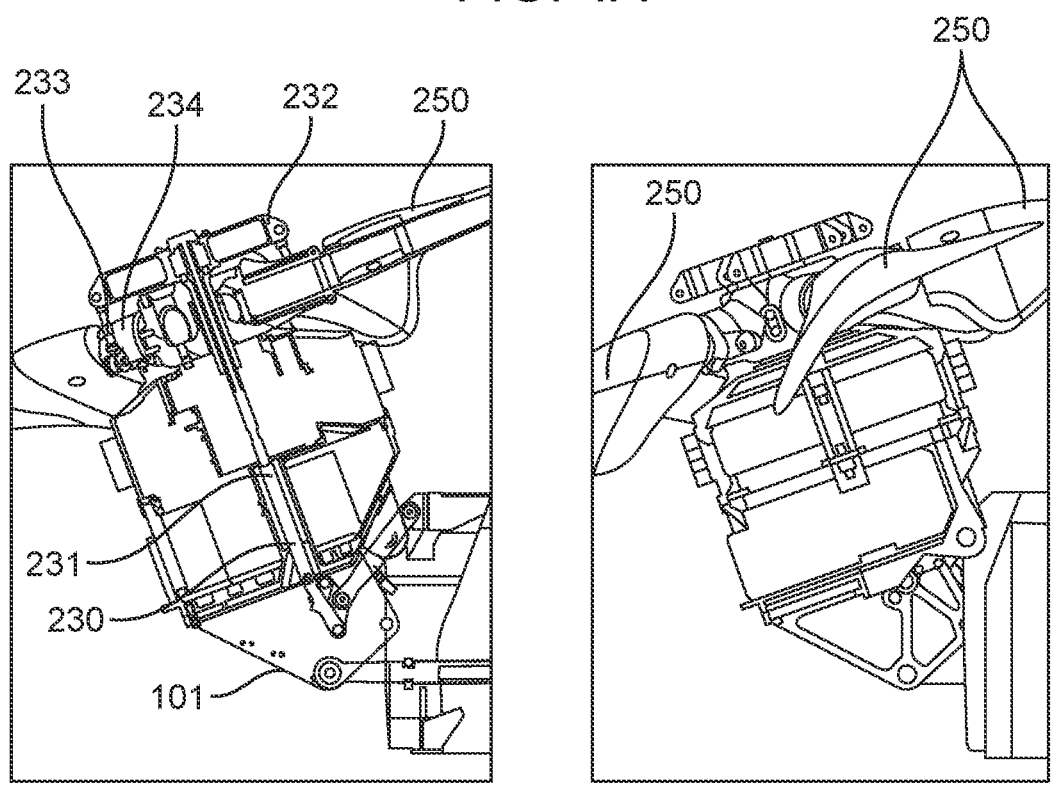
Figure 4C:
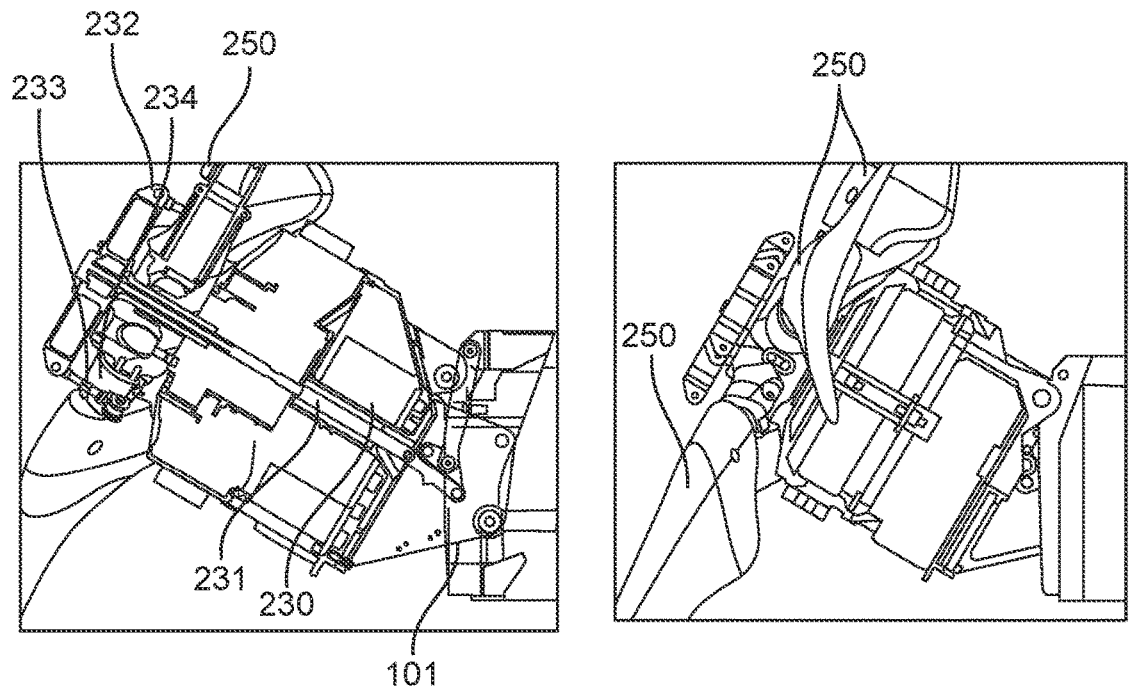
Figure 4D:
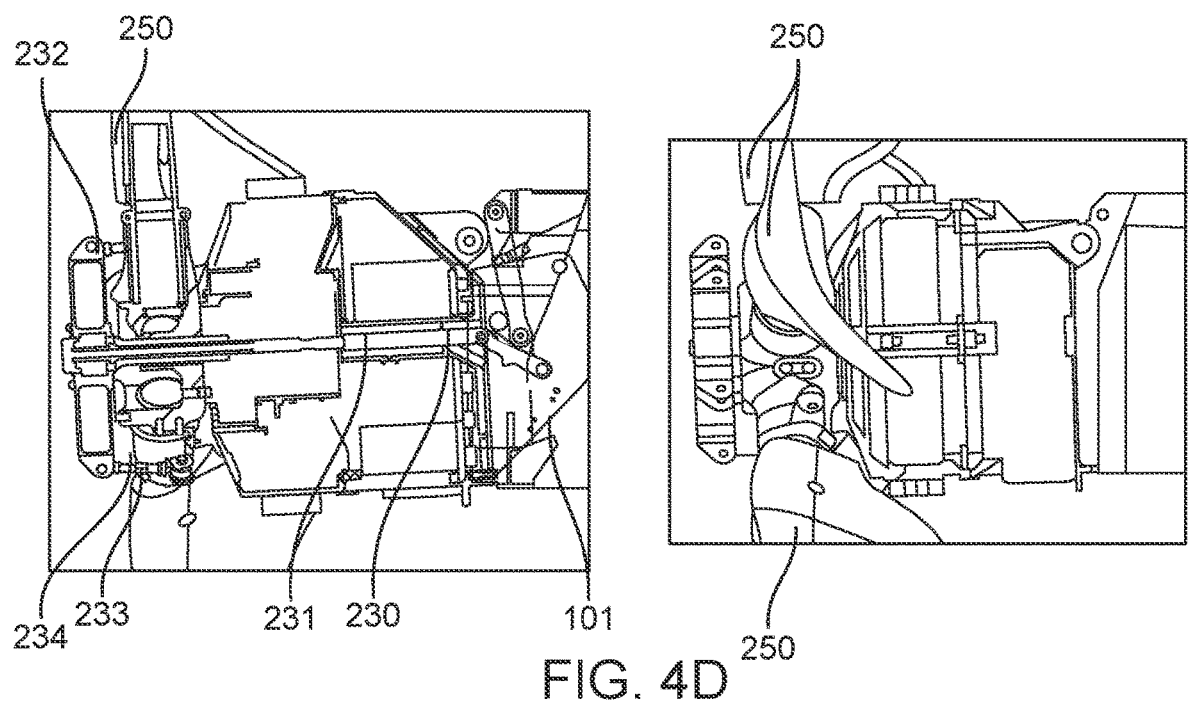

FIGS. 3A-3B illustrate a propulsion system 101 with a rotor blade 250 that has a variable pitch position. The rotor blade 250 may be configured to rotate through a predefined range of pitch positions, which can include a first pitch position 380 as illustrated in FIG. 3A, and a second pitch position 390 as illustrated in FIG. 3B.

The first pitch position 380 may be used during a first stage of flight, such as vertical takeoff, landing, hover, forward acceleration, gaining altitude, etc. (e.g., when the aircraft is in the vertical flight configuration). The first pitch position 380 may be referred to as hover pitch or acceleration pitch. The first pitch position 380 can be any pitch that is suitable for hover flight, takeoff, and/or acceleration. As an example, the first pitch position 380 can be any suitable pitch between about 5 degrees and about 25 degrees (e.g., 5 degrees, 10 degrees, 15 degrees, 18 degrees, 20 degrees, 23 degrees, 25 degrees).

The second pitch position 390 (e.g., 40 degrees) may be used during a second stage of flight, such as cruising flight (e.g., when the aircraft is in the forward flight configuration). This second pitch position 390 may be referred to as cruise pitch or efficiency pitch. The second pitch position 390 can be any pitch that is suitable for cruising forward flight (e.g., for efficient flying at cruising conditions). As an example, the second pitch position 390 can be any suitable pitch between about 30 degrees and about 50 degrees (e.g., 30 degrees, 35 degrees, 40 degrees, 45 degrees, 50 degrees).

In some embodiments, the first pitch position 380 may be a minimum pitch, and the second pitch position 390 may be a maximum pitch of an exemplary rotor blade 250, with other pitch positions existing between the first pitch position 380 and the second pitch position 390. In other embodiments, the rotor blade 250 may be able to reach pitches lower than the first pitch position 380 and pitches higher than the second pitch position 390.

Referring back to FIG. 1, as described above, one or more of the propulsion systems 101(A)-(L) may be tilting fans that can tilt between a forward flight configuration and a vertical flight configuration. Accordingly, in some embodiments, both a blade pitch of rotor blades and a tilt angle of a tilting fan can be adjustable. Both the blade pitch and the tilt angle may be adjusted based on the current flight stage or other movement needs of the aircraft. For example, during takeoff, one or more tilting fans can be set to have a vertical flight configuration to provide vertical lift, and one or more sets of rotor blades can be set to have a low pitch. During cruise flight, one or more tilting fans can be set to have a forward flight configuration to provide horizontal thrust, and one or more sets of rotor blades can be set to have a high pitch. There may be times when the settings are paired differently. For example, before cruising speed is reached, one or more tilting fans can be set to have a forward flight configuration or an intermediary tilt angle and configuration to provide horizontal thrust, while one or more sets of rotor blades may be set to have a low pitch to provide optimal acceleration. Once a certain predetermined speed and/or predetermined altitude are reached, the low pitch can be changed to a high pitch.

Coupling Rotor Blade Pitch to Propulsion System Tilt

According to various embodiments, a pitching mechanism can be coupled to and/or combined with a tilting mechanism. The pitching mechanism can be configured so that a movement or change in propulsion system tilt automatically causes a corresponding movement or change in the pitch of one or more rotor blades of the propulsion system.

Embodiments can couple the pitching mechanism with the tilting mechanism in any suitable manner. For example, a single actuator (e.g., a motor) may control both the tilting mechanism and the pitching mechanism. In some embodiments, an actuator of the tilting mechanism may be coupled to the pitching mechanism, and a separate dedicated actuator of the pitching mechanism can be omitted thereby reducing the number of actuators on the aircraft. The actuator can be directly linked to the pitching mechanism, or alternatively the actuator can be indirectly coupled to the pitching mechanism through one or more other components, such as components of the tilting mechanism.

FIGS. 2A-2B illustrate an example of a propulsion system 101 with a pitching mechanism 230 coupled to a tilting mechanism 220. The propulsion system 101 can include a coupling mechanism 240 that can be configured to couple (e.g., directly, or indirectly) the tilting mechanism 220 to the pitching mechanism 230. The tilting mechanism 220 can be referred to as a first mechanism, the pitching mechanism 230 can be referred to as a second mechanism, and the coupling mechanism 240 can be referred to as a third mechanism.

Angular motion caused by the tilting mechanism 220 can be translated into linear motion at the coupling mechanism 240 through a coupling of the tilting mechanism 220 and the coupling mechanism 240. Further, linear motion at the coupling mechanism 240 can be translated to twisting motion at the pitching mechanism 230 through a coupling of the pitching mechanism 230 and the coupling mechanism 240. As a result, motion caused by the tilting mechanism 220 can be translated into twisting motion at the pitching mechanism 230 through the coupling mechanism 240. An actuator 221 of the tilting mechanism 220 can thereby actuate and/or control both the tilting mechanism 220 and the pitching mechanism 230 simultaneously in a linked manner.

In some embodiments, the coupling mechanism 240 can include one or more components that are directly coupled to the pitching mechanism 230, as shown in FIGS. 2A-2B. Additionally, the coupling mechanism 240 can include one or more components that are indirectly coupled to the tilting mechanism 220. For example, similar to the tilting mechanism 220, the coupling mechanism 240 can include one or more components that are coupled to the support structure 106 and the propulsion system 101. As a result, even if the coupling mechanism 240 does not directly contact the tilting mechanism 220, relative position and/or angle changes between the support structure 106 and the propulsion system 101 (e.g., as caused by the tilting mechanism 220) can cause movement of one or more components of the coupling mechanism 240. In other embodiments, the coupling mechanism 240 can be directly coupled to one or more components of the tilting mechanism 220.

Tilting Mechanism

More specifically, as shown in FIGS. 2A-2B, in some embodiments, the tilting mechanism 220 can include an actuator 221, a load path including rod 223 and connection point 225. The actuator 221 can include a motor (e.g., electric motor) or a hydraulic system, as examples. Embodiments allow the actuator 221 to include a local power source (e.g., a battery), and/or be connected to a separate aircraft power source (e.g., a battery). Additionally, the actuator 221 can be in communication with and controlled by a central control system of the aircraft.

The load path including rod 223 can be coupled to the support structure 106 and to the propulsion system 101 at connection point 225. The connection point 225 can be rotatable connection point such as a ball screw, pin, or any other suitable form of connection. The rod 223 can be extendable (e.g., a "slider" configured for telescoping movement), and can thereby provide an extendable or otherwise dynamic and adjustable coupling between the propulsion system 101 and the support structure 106. As the rod 223 extends and retracts, the tilt position of the propulsion system 101 can be changed. The rod 223 may be coupled to and/or controllably extended and retracted by the actuator 221. As a result, the tilt configuration of the propulsion system 101 can be controlled by the actuator 221 through the rod 223. The actuator 221 and rod 223 can, taken together, be referred to as a linear actuator. The tilting mechanism 220 shown in FIGS. 2A-2B is for exemplary purposes, and embodiments allow any other suitable tilting mechanism components and configurations.

Pitching Mechanism

The pitching mechanism 230 can include a transfer rod 231, a hub 232, one or more blade rods 233, and one or more rotatable base components 234. The transfer rod 231 (which can also be referred to as a slider) can be positioned along a centerline of the propulsion system 101. The transfer rod 231 can be coupled at one end to the coupling mechanism 240, and at the other end to the hub 232 (e.g., a center portion of the hub). Motion of the coupling mechanism 240 (e.g., which may be caused by motion of the tilting mechanism 220) can cause the transfer rod 231 to linearly move forward and back along the centerline of the propulsion system 101 (e.g., sliding piston motion), which can in turn cause similar linear motion of the hub 232. During a forward flight configuration 212, the centerline of the propulsion system 101 can be aligned with the x-axis (as shown in FIG. 2B) or near the x-axis (e.g., angled above or below within a few degrees of the x-axis). During a vertical flight configuration 211, the centerline of the propulsion system 101 can be aligned with the z-axis (as shown in FIG. 2A) or near the z-axis (e.g., angled forward or backward within a few degrees of the z-axis). The hub 232 (also referred to as a collective), can be coupled to one or more blade rods 233 (also referred to as pitch links and/or pushrods), which can be positioned at or near points along the outer perimeter of hub 232. Movement of the hub 232 can cause similar forward and back movements of each of the one or more blade rods 233. Each of the blade rods 233 can be coupled to and/or combined with a corresponding rotatable base component 234, which may also be referred to as a blade cuff. A blade rod 233 and corresponding rotatable base component 234 can be configured such that forward and back motion of the blade rod 233 can cause rotation of the rotatable base component 234. For example, the rotatable base component 234 can be circular, and the blade rod 233 can be connected to an external surface of the circular shape, such that transverse motion of the blade rod 233 can be converted into rotation at the rotatable base component 234. A corresponding rotor blade 250 can be coupled to the rotatable base component 234, such that rotation of the rotatable base component 234 can cause the rotor blade 250 to change pitch. According to embodiments, each rotor blade 250 can be grouped with and coupled to a corresponding rotatable base component 234 and blade rod 233.

As shown, the pitching mechanism 230 can be located entirely on and/or be considered a part of the propulsion system 101. Additionally or alternatively, the actuator 221 and any other suitable components of the coupling mechanism 240 and tilting mechanism 220 can also be considered a part of the pitching mechanism 230, as they may be involved in generating the pitching movement, according to some embodiments. The pitching mechanism 230 shown in FIGS. 2A-2B is for exemplary purposes, and embodiments allow any other suitable pitching mechanism components and configurations.

Another example of a pitching mechanism 230 is illustrated in isolation in FIGS. 4A-4D. The figures demonstrate snapshots of a pitching mechanism 230 as it moves from a first pitch position (e.g., in FIG. 4A), through intermediary pitch positions (e.g., in FIGS. 4B-4C), and to a second pitch position (e.g., in FIG. 4D), as the propulsion system 101 is tilted or moved from vertical flight configuration (e.g., in FIG. 4A) to forward flight configuration (e.g., in FIG. 4D). Each one of FIGS. 4A-4D includes a first cross section image that reveals components of the pitching mechanism 230 within the propulsion system 101, and a second image showing the external surface of the propulsion system 101 with the rotor blades 250. A progression through FIGS. 4A-4D illustrates how the pitching mechanism 230 is actuated, and how, as a result, the rotor blades 250 are rotated or twisted through different pitch positions.

A further example of a pitching mechanism 930 is illustrated in near-isolation (e.g., without the propulsion system context) in FIGS. 9A-9D. The pitching mechanism 930 in FIGS. 9A-9D is coupled to an alternative coupling mechanism 906, but the components of the pitching mechanism 930 are otherwise similar. FIGS. 9A-9D demonstrate snapshots of the pitching mechanism 930 as it moves from a first pitch position (e.g., in FIG. 9A), through intermediary pitch positions (e.g., in FIGS. 9B-9C), and to a second pitch position (e.g., in FIG. 9D). FIGS. 9A-9D are described below in greater detail.

Coupling Mechanism

Referring back to FIGS. 2A-2B, the coupling mechanism 240 can include any suitable components and structure for coupling the tilting mechanism 220 to the pitching mechanism 230. An example of the coupling mechanism 240, as shown through different snapshots of movement, is illustrated in FIGS. 5A-5D. As shown, the coupling mechanism 240 can include multiple rigid structures 242, 244, and 247, which can include rods, bars, angular connectors, and/or any other structure suitable for translating motion. The first rigid structure 247 may be a pitch link, the second rigid structure 244 may be a rocker link, and the third rigid structure 242 may be a pushrod link. Additionally, the coupling mechanism 240 can include connection points 241, 243, 245, 246, and 248, which may take the form of pins or any other suitable rotating connection point. The connection point 248 may connect the coupling mechanism 240 to a support structure (e.g., boom) of the aircraft. The connection point 241 may connect the coupling mechanism 240 to the transfer rod 231 of the pitching mechanism 230 on the propulsion system 101. The remaining connection points 243, 245, and 246 may connect the rigid structures 242, 244, and 247 and create one or more prismatic joints. The components can be sized and arranged such that the coupling mechanism 240 is put into relative motion (e.g., by changing shape or position of components) when the propulsion system tilts (e.g., as caused by the actuator 221 of the tilting mechanism 220), and such that the movement causes the transfer rod 231 of the pitching mechanism 230 to be put into motion. For example, the tilting of the propulsion system 101 may be about a first pivot point (or center of rotation), while the coupling mechanism 240 may have a second pivot point that is offset from the first pivot point. The offset between the two pivot points causes the relative motion and thereby movement of the transfer rod 231.

Figure 5B:
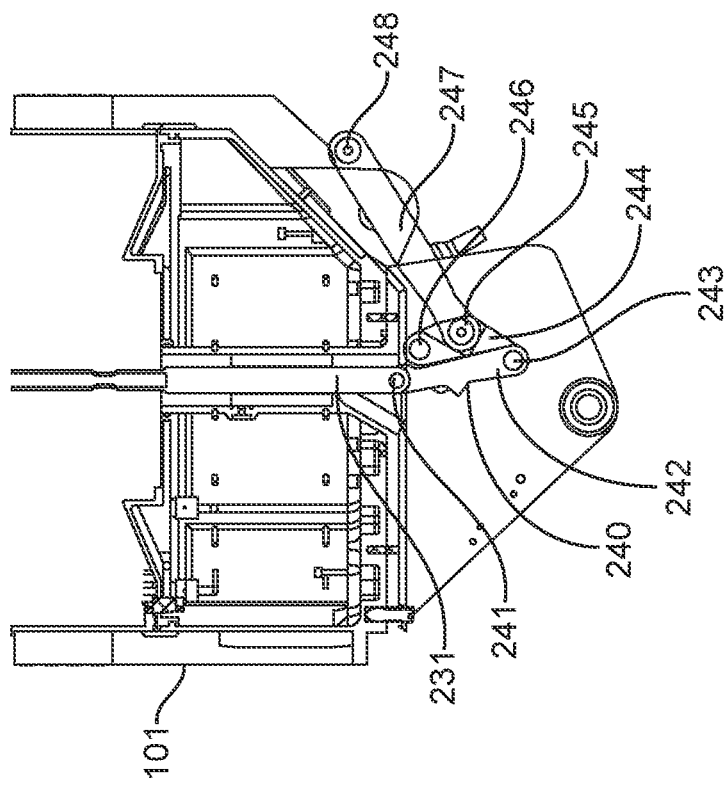
FIGS. 5A-5D illustrate an example of movement of the coupling mechanism, according to various embodiments.
Figure 5A:
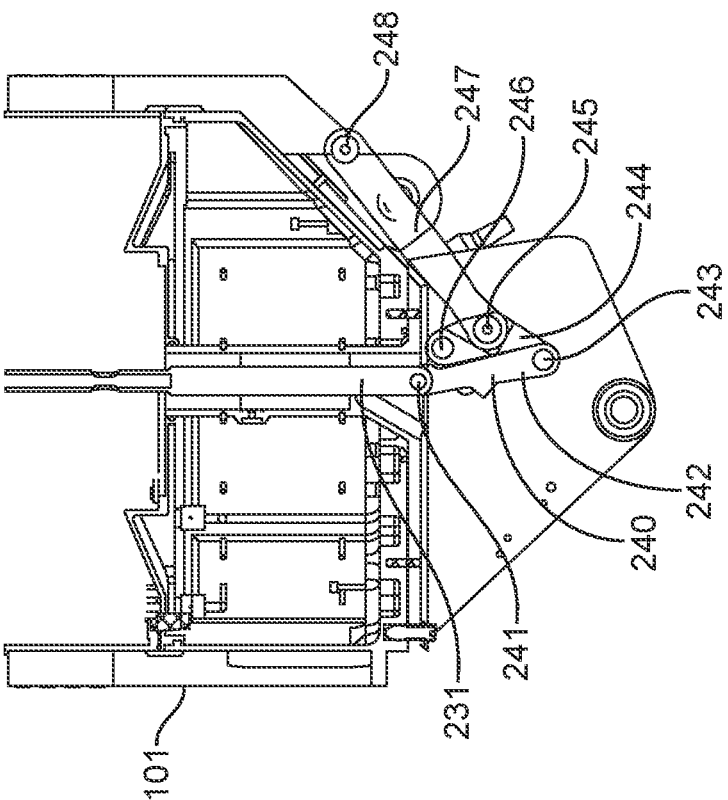
Figure 5D:
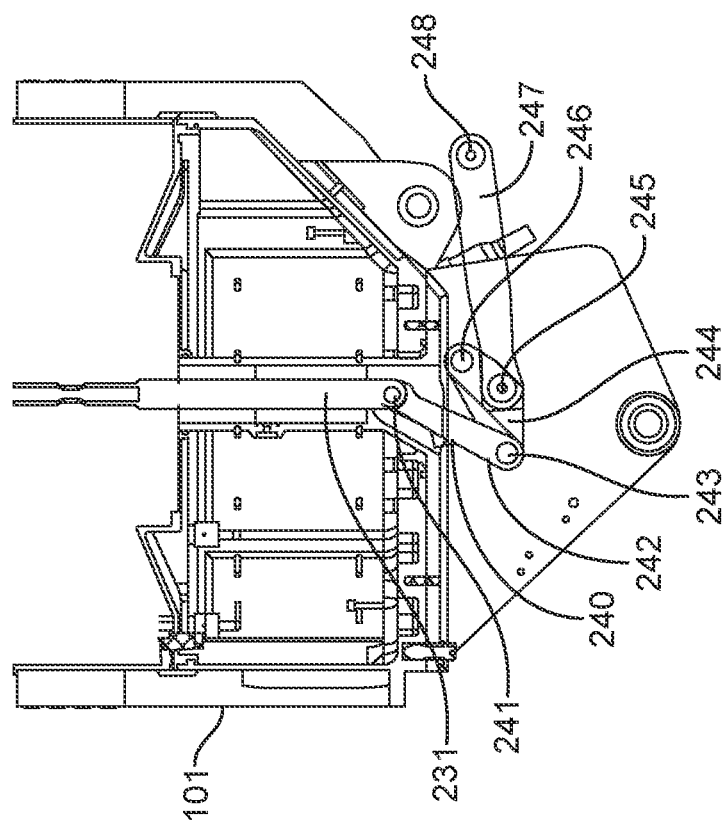
Figure 5C:
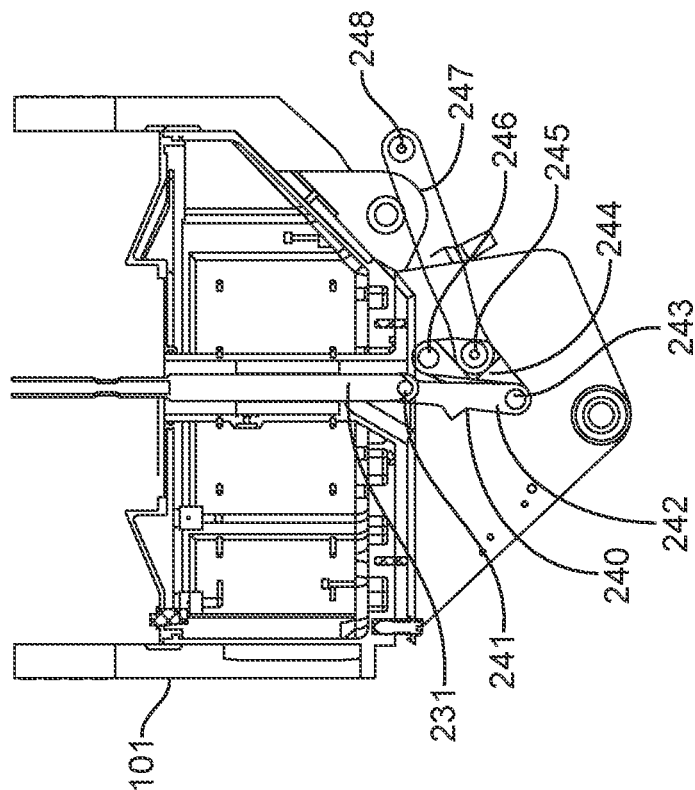

FIGS. 5A-5D demonstrate an example of movement of the coupling mechanism 240 as the propulsion system 101 is tilted from a vertical flight configuration to a forward flight configuration, as caused by an actuator of the tilting mechanism 220. FIG. 5A can represent the vertical flight configuration, FIG. 5D can represent forward flight configuration, and FIGS. 5B-5C can represent intermediary tilt angles and configurations. From the reference frame of the aircraft, the propulsion system 101 tilts from vertical to horizontal, and the connection point 248 (as well as the aircraft and support structures, which are not shown) remains fixed. However, for the sake of illustrating movement of the coupling mechanism 240, the images of FIGS. 5A-5D are in the reference frame of the propulsion system 101. As a result, the propulsion system 101 is depicted similarly and unchanging across the snapshots, and it is easier to see the movement of the coupling mechanism 240. As shown, within this reference frame, the components of the coupling mechanism 240 generally are shifted toward the left, the rigid structure 247 is shifted downward and rotates from angled to about horizontal, and the rigid structure 242 is shifted upward. Due to the rigid structure 242 shifting upward, the transfer rod 231 of the pitching mechanism 230 is also shifted upward, which in turn causes a pitch change at the rotor blade. Thus, active tilting of the propulsion system 101 can cause responsive (or passive) motion at the coupling mechanism 240 and thereby also responsive (or passive) motion at the pitching mechanism 230. These movements can all be caused by and controlled through a single actuator, such as the actuator 221 of the tilting mechanism 220 as shown in FIG. 2A.

Non-Linear Tilt-Pitch Relationship

Referring back to FIGS. 2A-2B, a coupling of the tilting mechanism 220 to the pitching mechanism 230 can be configured so that a change in tilt angle can be translated to any suitable amount of change in pitch position. In some embodiments, a change in tilt angle can have a linear relationship with a responsive change in pitch. For example, a 1-degree change in tilt angle can cause any suitable corresponding amount of change in pitch (e.g., 0.1 degrees, 0.3 degrees, 0.5 degrees, 0.8 degrees, 1 degree, 2 degrees, etc.), without regard to the current pitch position and/or tilt angle.

In other embodiments, a change in tilt angle can have a non-linear relationship with a responsive change in pitch position. An amount of pitch change can depend on the current tilt angle and/or pitch position in addition to the amount of change in tilt angle.

A coupling between the tilting mechanism and the pitching mechanism can be configured to provide such a non-linear relationship between tilt angle and pitch position. For example, according to embodiments, the coupling mechanism 240 can be configured to provide a non-linear relationship between tilt angle and pitch position. For example, referring back to FIGS. 5A-5D, any suitable non-linear relationship between tilt angle and pitch position can be achieved by a corresponding configuration (e.g., shape, size, and/or position) one or more of the rigid structures 242, 244, and/or 247, and/or one or more of the connection points 241, 243, 245, 246, and/or 248. The configuration of the rigid structures 242, 244, 247 and/or the connection points 241, 243, 245, 246, 248 can collectively affect the linear motion generated by the coupling mechanism 240 at the transfer rod 231 as the tilt angle is changed, and can therefore be arranged such that certain blade pitch positions are achieved at corresponding predefined tilt angles as desired.

An example of a non-linear relationship between tilt angle and pitch position is illustrated in the chart 600 of FIG. 6. In the chart 600, the x-axis represents the tilt angle 620 of a propulsion system, with the tilt angle increasing to the right. The y-axis represents the pitch position 630 of one or more rotor blades of the propulsion system, with the pitch position increasing as the y-value increases.

The chart 600 includes a set of plotted points that demonstrate examples of pitch positions that may be linked to and/or caused by corresponding tilt angles, due to the configuration of the coupling between the tilting mechanism and the pitching mechanism. As shown, the pitch position generally increases as the tilt angle decreases.

Point 680 can represent a tilt angle associated with a vertical flight configuration (e.g., about 90 degrees), as well as a first pitch position that is used during a vertical flight configuration. The first pitch position can be any suitable pitch for vertical flight, such as a pitch position between about 5 degrees and about 25 degrees (e.g., 5 degrees, 10 degrees, 15 degrees, 18 degrees, 20 degrees, 23 degrees, 25 degrees).

Point 690 can represent a tilt angle associated with a forward flight configuration (e.g., about 0 degrees), as well as a second pitch position that is used during a forward flight configuration. The second pitch position can be any suitable pitch for forward cruising flight, such as a pitch position between about 30 degrees and about 50 degrees (e.g., 30 degrees, 35 degrees, 40 degrees, 45 degrees, 50 degrees).

The chart 600 illustrates a non-linear change in pitch position 630 as the tilt angle 620 angle changes. Notably, at higher tilt angles (e.g., near the point 680), the pitch position has a relatively smaller change (e.g., amount of variation). At lower tilt angles (e.g., near the point 690), the pitch position has a relatively larger change (e.g., amount of variation).

A non-linear relationship of this type can beneficially allow a lower pitch position 630 to be utilized for a greater range of tilt angles 620, in comparison with a linear relationship. Lower pitch positions can provide a greater thrust, and therefore may be desirable for multiple stages of flight that utilize an intermediary tilt angle 620. For example, during forward acceleration and altitude gaining, a propulsion system may be tilted through a range of intermediary tilt angles to provide components of both forward acceleration and vertical lift. A greater thrust output may be desired for these stages of flight, so it can be beneficial to maintain a lower pitch position even as a propulsion system continues to tilt.

Later on, when the aircraft has gained altitude and speed, and is entering a forward cruising flight stage, the tilt angle of the propulsion system can be nearing horizontal orientation. At this point, it can be advantageous for the pitch position to change more rapidly in order to reach a higher pitch position, as a higher pitch position can produce a desired efficiency during forward cruising flight.

The chart 600 includes a point 685, which marks an intermediary tilt angle that is near the horizontal (or about-horizontal) angle of the forward flight configuration. This intermediary tilt angle may be referred to as a third tilt angle. The third tilt angle at point 685 may be slightly above horizontal (e.g., 3 degrees, 5 degrees, 8 degrees, 10 degrees, 15 degrees, or any other suitable angle). As shown, the pitch position at point 685, which can be referred to as a third pitch position, is still a meaningful amount lower than the second pitch position at point 690 due to the steep curve in this region of the chart 600. The third pitch position may be any suitable amount lower than the second pitch position, such as 3 degrees lower, 5 degrees lower, 7 degrees lower, 10 degrees lower, 15 degrees lower, 20 degrees lower, etc.

In some embodiments, during acceleration and altitude-gaining stages of flight, the propulsion system may be continuously or regularly tilted from the vertical flight configuration toward the forward flight configuration. However, the tilting may pause for any suitable amount of time at the third tilt angle of point 685. This can allow the propulsion system to provide primarily horizontal thrust (e.g., similar to the forward flight configuration), while also maintaining the third pitch position which is lower than the second pitch position and can thereby provide a greater thrust output. Once a sufficient speed and altitude are obtained, the final tilting from point 685 to point 690 can be executed to reach the forward cruising flight configuration. This final small tilt may not be a large adjustment to the thrust direction, but may functionally modify the rotor blade pitch position so that efficiency is now prioritized over maximum thrust output for forward cruising flight.

In other words, the non-linear relationship shown in the chart 600 can effectively allow the pitch position to be controlled and modified in relative isolation when the current tilt angle is near point 690, without requiring a significant change in tilt angle, even though the tilt angle is coupled to the pitch position. Similarly, the non-linear relationship shown in the chart 600 can effectively allow the tilt angle to be controlled and modified in relative isolation when the current tilt angle is near point 680, without requiring a significant change in pitch position, even though the tilt angle is coupled to the pitch position.

Hydraulic Line

Embodiments provide various mechanisms integrated with a tilting mechanism of a tilting lift fan for scheduling the tilt angle of the tilting lift fan with the blade pitch angle of the rotor blades. Accordingly, embodiments reduce complexity and eliminate the need for an additional actuator for pitch control.

In some embodiments, instead of coupling the pitching mechanism to the actuator through the coupling mechanism and/or the tilting mechanism (e.g., in series), the pitching mechanism can be coupled directly to the actuator (e.g., in parallel with the tilting mechanism).

For example, an exemplary mechanism may include a hydraulic system with a first line to the tilting mechanism and a second line to the pitching mechanism. The hydraulic system may comprise a primary cylinder connected to the tilting mechanism and a secondary cylinder connected to the pitching mechanism. A hydraulic line may couple the secondary cylinder to the line connecting the pump to the first cylinder. When the pump moves the primary cylinder, the hydraulic line that goes from the primary cylinder to the secondary cylinder drives the secondary cylinder as well. Therefore, one pump drives two cylinders through a hydraulic linkage thereby acting as one actuator that is driving tilting of the tiltable lift fan and blade pitch of the blades of the tiltable lift fan.

Additional Actuator for Fine Pitch Control

According to some embodiments, an additional actuator can be included for fine control of the pitching mechanism. The pitching mechanism may still be coupled to the tilting mechanism, but this second actuator can provide small adjustments to the overall pitch position. For example, the second actuator may be able to adjust the pitch position by 0.5 degrees, 1 degree, 1.5 degrees, 2 degrees, 5 degrees, or any other suitable amount, relative to the overall pitch position as caused by the coupling to the tilting mechanism. The second actuator can be entirely located on the propulsion system, or some or all of the second actuator may be located on the support structure or elsewhere on the aircraft.

Position Sensor

According to some embodiments, as shown in FIGS. 2A-2B, a position sensor 290 may be included as a part of the pitching mechanism 230, or otherwise on the propulsion system 101. The position sensor 290 may be positioned at and/or coupled to any suitable part of the pitching mechanism 230 and/or one or more rotor blades 250.

The position sensor 290 may be configured to monitor a current pitch position of one or more rotor blades. The position sensor 290 may also be configured to communicate with the control system and to provide information about the current pitch position. Due to the coupling between the tilting mechanism 220 and the pitching mechanism 230, the control system may be in indirect control of the pitching mechanism 230 (e.g., through the tilting mechanism 220), and may not be able to determine, through the tilting mechanism 220 or actuator 221, whether the pitching mechanism 230 is functioning according to predefined conditions or positioned as intended. Accordingly, the position sensor 290 may provide pitch position information that otherwise might be lost through the coupling arrangement.

Offset Pivot Mechanism

Figure 7C:
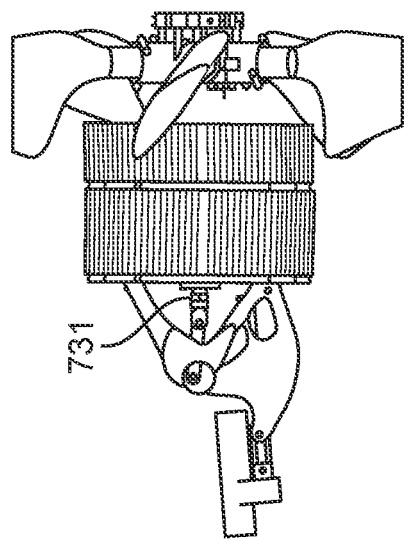
FIGS. 7A-7C illustrate an example of an offset pivot mechanism, according to embodiments.
Figure 7B:
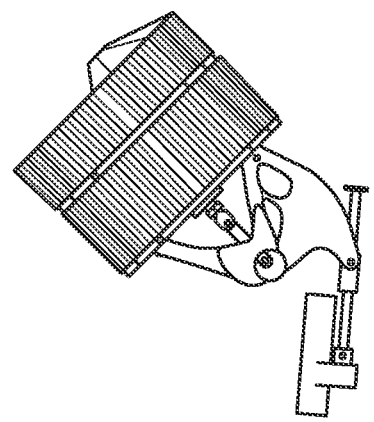
Figure 7A:
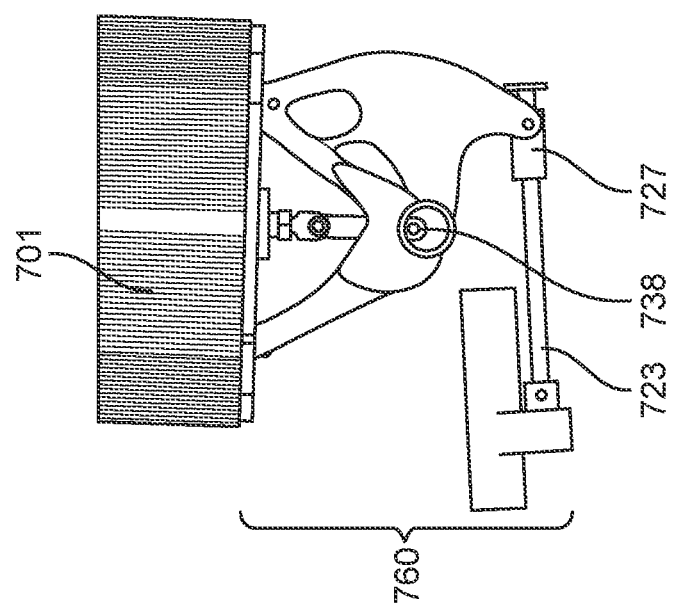

According to various embodiments, an exemplary coupling mechanism may include an offset pivot mechanism. FIGS. 7A-7C illustrate an example of a propulsion system with a pitching mechanism coupled to a tilting mechanism through an offset pivot mechanism, according to certain embodiments. The offset pivot mechanism 750 is coupled to a tiltable lift fan 701, according to various embodiments. The offset pivot mechanism 750 can include a first mechanism, a second mechanism and a third mechanism.

The first mechanism can include a linear actuator 723 with a ball screw 727 coupled thereto. The first mechanism can pivot the entire tiltable lift fan 701 between a vertical flight configuration as illustrated in FIG. 7A, and a forward flight configuration as illustrated FIG. 7C.

The third mechanism can include a first element 738 (e.g., a link) and a second element 731 (e.g., slider) that extends through a centerline of the motor (e.g., the motor of the tiltable lift fan 701). The third mechanism can convert the tilting motion into a pistoning motion of the second element 731. In the forward flight configuration shown in FIG. 7C, the second element 731 is pulled to the left, out of the motor. In the vertical flight configuration shown in FIG. 7A, the second element 731 is pushed right, into the motor. The second element 731 has a linear motion, which may not allow twisting, in and out of the motor.

The second mechanism converts linear motion of the second element 731 into a twisting motion of one or more rotor blades (e.g., via, for example, twisting cuffs coupled to the rotor blades). As a result, a pitch position of the rotor blades can change when the tiltable lift fan 701 pivots between different tilt configurations.

According to embodiments, the first element 738 can have a second pivot point that is off-centered or otherwise not differently positioned relative to a first pivot of the tiltable lift fan 701. The different centers of rotation cause the linear movement (or change in length) of the second element 731. The motion of second element 731 results in the blade pitch change.

According to various embodiments, one or more of the joints in the offset pivot mechanism 750 may be revolute joints providing surface contact between all of the moving elements. In some embodiments, the offset pivot mechanism 750 may include roller bearings on the joints or surface contact like bushings.

According to various embodiments, the offset pivot mechanism 750 may provide about 40 to 70 degrees of rotor blade pitch change.

Four-Bar Crank Slider

Figure 8A:
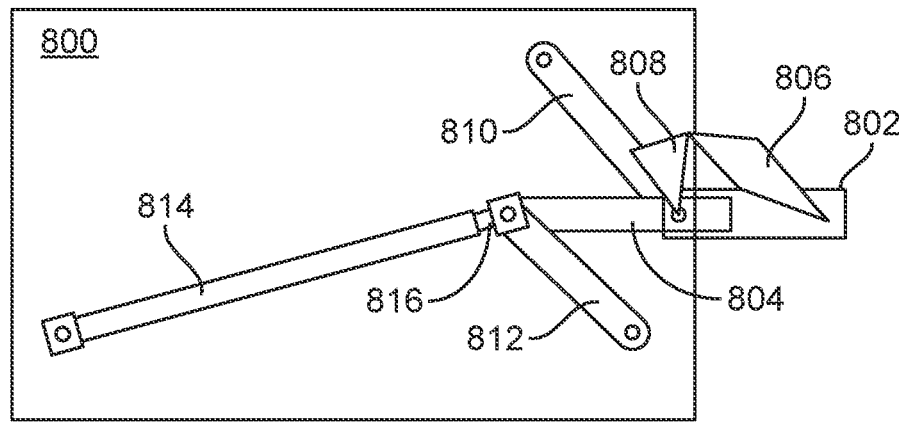
FIGS. 8A-8B illustrate an example of a coupling mechanism in the form of an exemplary four-bar crank slider mechanism, according to various embodiments.
Figure 8B:
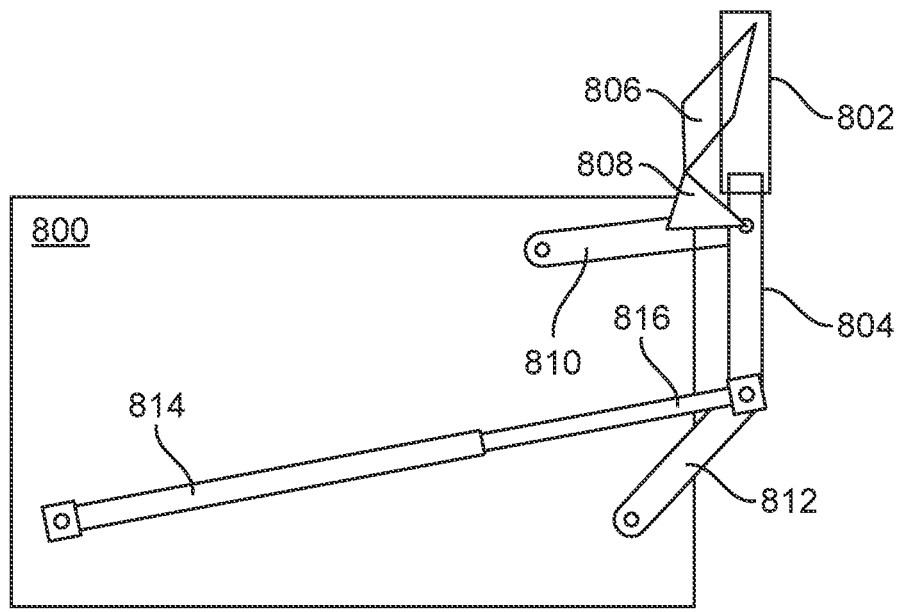
Figure 9A:
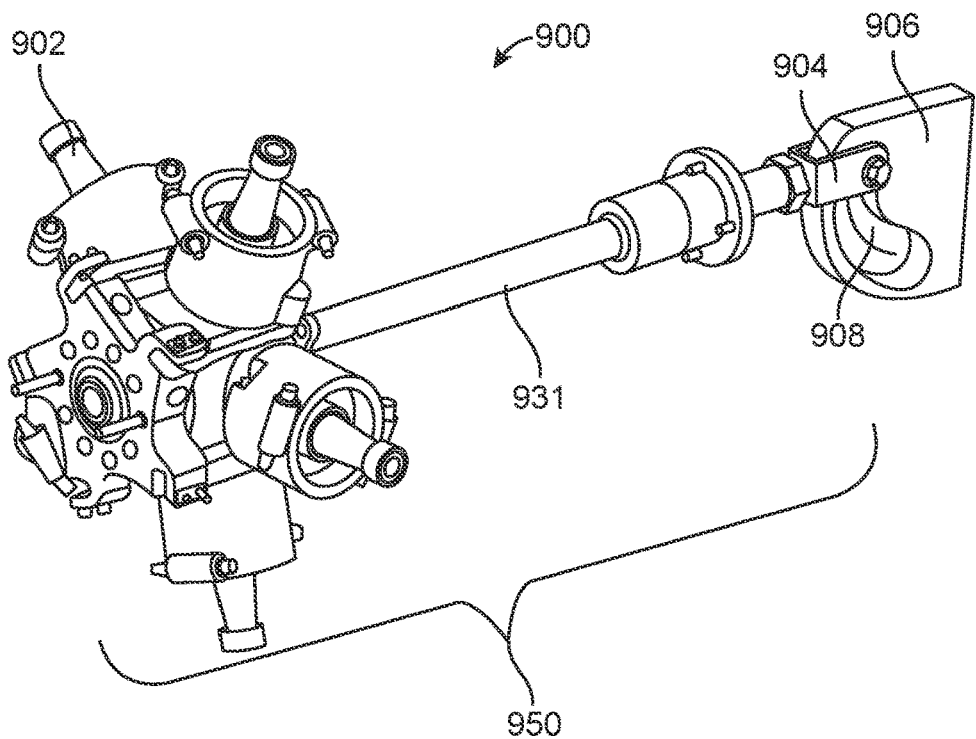
FIGS. 9A-9D illustrates a roller cam on centerline mechanism, according to various embodiments.
Figure 9B:
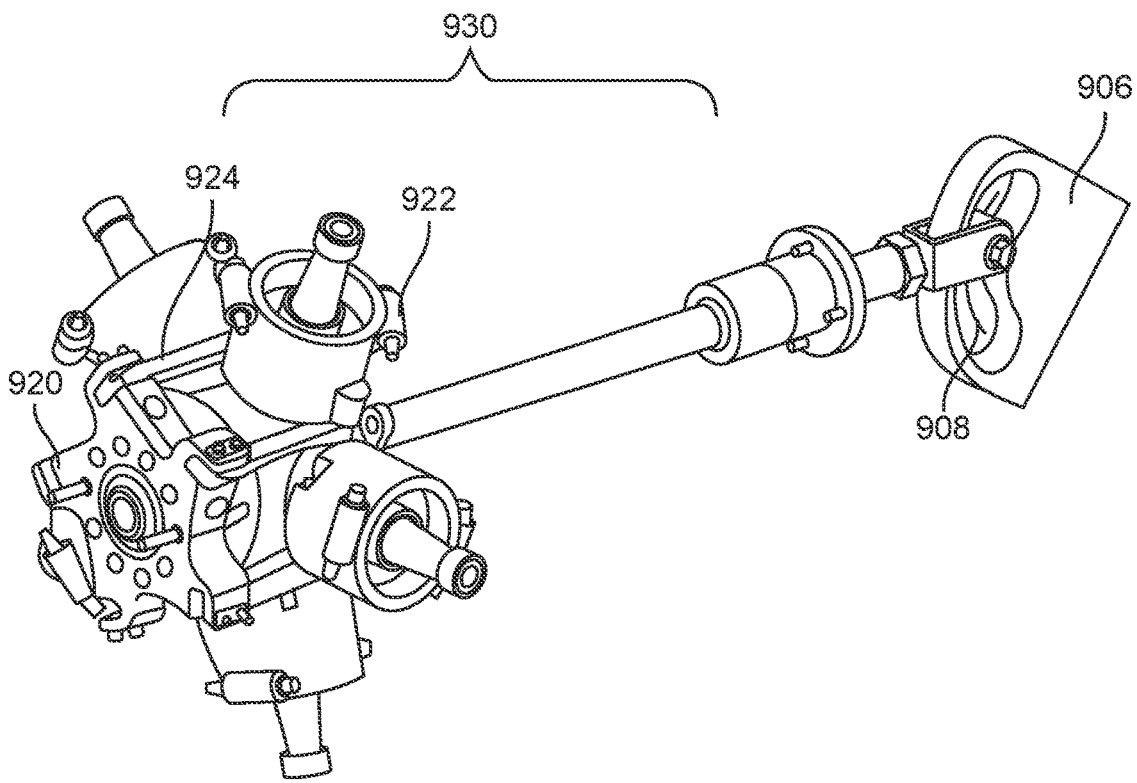
Figure 9C:
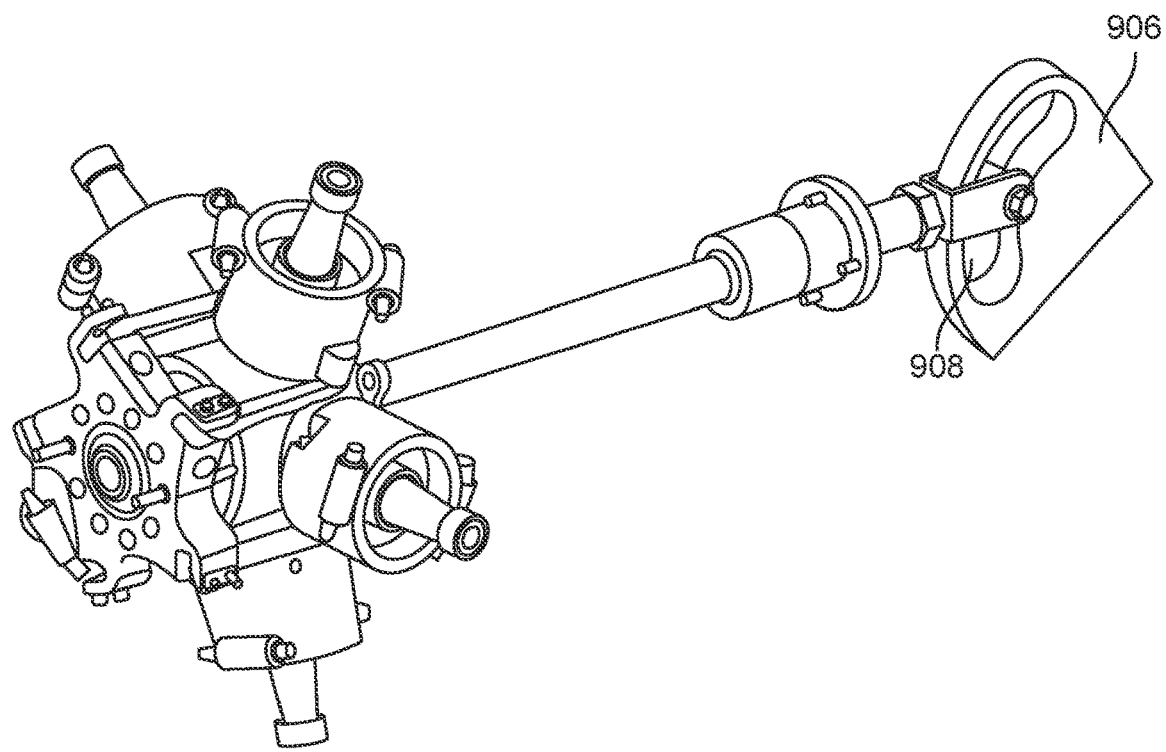
Figure 9D:
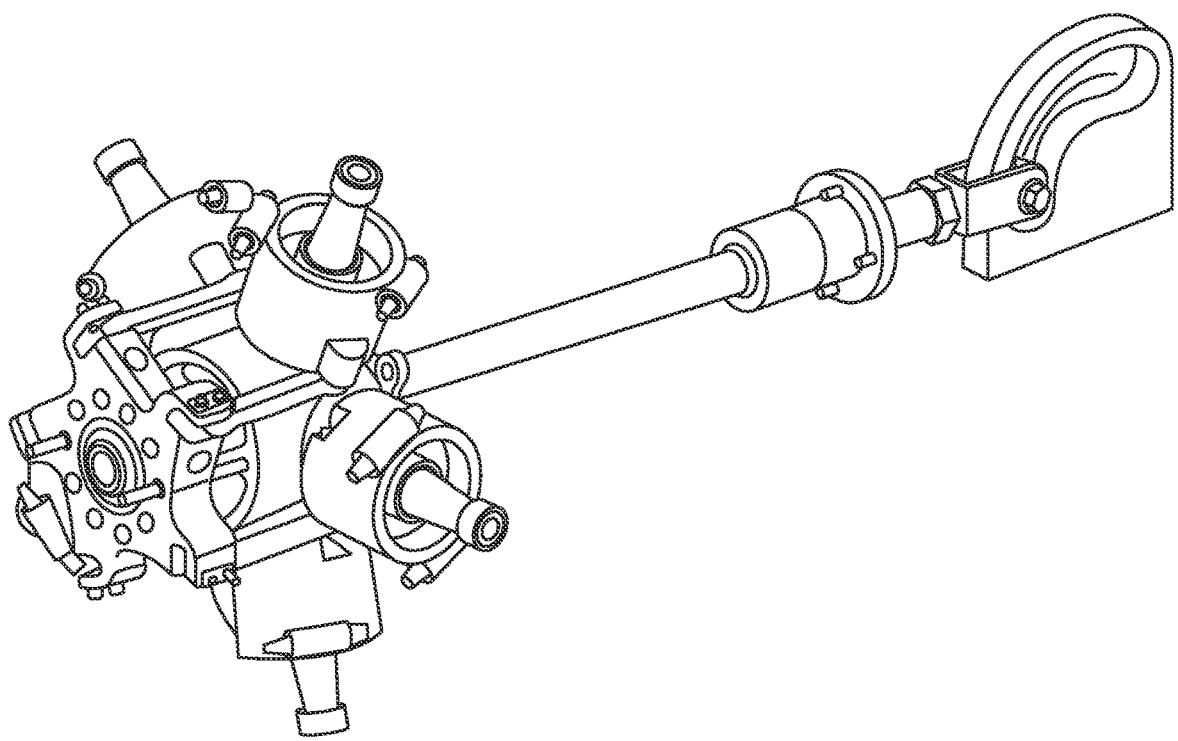

According to various embodiments, an exemplary coupling mechanism may include a four-bar crank slider mechanism. FIGS. 8A-8B illustrate another example of a coupling mechanism in the form of an exemplary four-bar crank slider mechanism 800, according to various embodiments. The four-bar crank slider mechanism 800 includes a first bar 804, a second bar 810, a third bar 812, and a fourth bar 814. An inner bar 816 slides in-and-out (e.g., telescopes) of the fourth bar 814, forming a slider.

The four-bar crank slider 800 includes a first element 102 that slides linearly along the first bar 804, a second element 808 (e.g., a first joint) that is rigidly connected to the second bar 810, and a third element 806 (e.g., a second joint) connected between the second element 808 and the first element 802, forming a four-bar with a crank slide. The second element 808 is a prismatic joint between the first element 802 and the first bar 804. The third element 806 is tied to the second element 808 rather than being tied to ground.

According to various embodiments, the four-bar crank slider mechanism 800 may be coupled to a tiltable lift fan. The first element 802 can be coupled to a pitching mechanism of the lift fan that can change the pitch of the rotor blades of the lift fan. The first bar 804 can be coupled to a motor of the lift fan with the propeller attached thereto.

FIG. 8A illustrates the system (e.g., the four-bar crank slider mechanism 800 coupled to the tiltable lift fan) in a forward flight configuration. FIG. 8B illustrates the system in a vertical flight configuration.

In response to the lift fan tilting from a forward flight configuration to a vertical flight configuration, the first element 802 may slide up, resulting in a linear motion. The linear motion is then translated into a rotational motion of the first bar 804 via the second element 808 and third element 806. As the tiltable lift fan moves from the vertical flight configuration back to the forward flight configuration, the first element 802 slides with respect to the first bar 804 because the axial sliding activates a blade pitch mechanism, thereby providing an axial pistoning motion.

The first element 802, the second element 808, and the third element 806 enable the sliding motion of the inner bar 816 in-and-out of the fourth bar 814. The relative motion of the first bar 804 and either the third bar 812 or the second bar 810 actuates the blade pitching mechanism. Therefore, the blade pitch mechanism may not require an additional actuator dedicated to changing the blade pitch, according to embodiments.

Roller Cam on Centerline

Embodiments allow the coupling mechanism to take any other suitable form. As another example, the coupling mechanism can take the form of a roller cam coupled to a structure with a curved slot. The roller cam can be couple to the transfer rod of the pitching mechanism, and structure with the curved slot can be attached to the support structure (e.g., and not on the propulsion system). As a result, tilting of the propulsion system can cause the roller cam to roll within the curved slot. As the roller cam rolls, the curvature of the slot and/or the tilting movement may cause the roller cam to be pressed inward and/or pulled outward relative to the pitching mechanism (e.g., depending on the direction of tilting), and thereby move the transfer rod of the pitching mechanism forward and back.

FIGS. 9A-9D illustrates a roller cam on centerline mechanism 900, according to various embodiments. The roller cam on centerline mechanism 900 includes a static portion 906 (e.g., the structure with curved slot) and a pivoting portion 950, which can include the pitching mechanism 930 and a roller cam 904.

In FIGS. 9A-9D, the static portion 906 (e.g., which can be the coupling mechanism) corresponds to the first element 738 illustrated in FIGS. 7A-7D, and the slider 931 corresponds to the second element 731 in FIGS. 7A-7D. The pivoting portion 950 is coupled to the static portion 906, and pivots along a predetermined path 908 with respect to the static portion 906. While one end of the pivoting portion 950 is coupled to the static portion 906, the opposite end includes a cuff 902 for each blade of a tiltable lift fan that can be coupled to the roller cam on centerline mechanism 900.

When the pivoting portion 950 pivots with respect to the static portion 906 (e.g., due to tilting of a propulsion system), the cuffs 902 coupled to the blades twist. FIGS. 9A-9D illustrate twisting of the cuff 902 in a left-twist motion while the pivoting portion 950 pivots in a counter-clockwise motion with respect to the static portion 906. The roller cam on centerline mechanism 900 converts the tilt angle of the pivoting portion 950 to a pistoning motion of the slider 931, which in turn change the blade pitch by twisting the cuffs 902 coupled to the blades.

The pitching mechanism 930 converts the linear motion of the slider 931 into a twisting motion of the blades (by, for example, twisting the cuffs coupled to the blades). For example, the pitching mechanism 930 may include a coupler 920 that is provided around a distal end of the slider 931.

The coupler 920 may have a star shape as illustrated in FIG. 9. The coupler 920 may move along with the slider 931 in a linear motion.

The coupler 920 may be attached to the plurality of blades via attachment means 922 (e.g., cuffs). For example, the coupler 920 may be coupled to the attachment means 922 via one or more links 924 that extend parallel to the slider 931. The linear movement of the slider 931 and the coupler 230, causes the links 924 to move linearly, which then rotates the attachment means 922, and thereby the blades.

According to various embodiments, the geometry of the curved slot 908 of the static portion 906 may be modified (e.g., linear, parabolic, etc.) to change the scheduling of the blade pitch. For example, a sharper curve in a first specified region along the curved slot 908 (e.g., corresponding to a first range of tilt angles) can produce a faster change in pitch, while a sharper curve in second specified region along the curved slot 908 (e.g., corresponding to a second range of tilt angles) can produce a slower change in pitch. The curved slot 908 may be a sealed opening that is sealed against foreign object debris.

Control System

Referring back to FIGS. 1A-1B, according to various embodiments, the aircraft 100 may be an electrically powered aircraft or a hybrid-electric aircraft. One or more battery units may be included in the aircraft 100 (e.g., within the fuselage 104) and configured to provide power to various aircraft components, such as one or more electric motors and/or on-board computer systems. The propulsion systems 101(A)-(L) may be driven by electric motors that are powered by an electric power system including the one or more battery units. In some embodiments, each of the propulsion systems propulsion systems 101(A)-(L) may be coupled to a dedicated battery unit. Alternatively, there may be a one-to-many relationship between the one or more battery units and the propulsion systems 101(A)-(L). In some cases, one or more battery units may be the sole power source for the aircraft 100. Each battery unit may include one or more battery cells.

According to various embodiments, the aircraft 100 may include a control system 107, such as a flight control system, which is configured to control the aircraft 100. The control system 107 may be configurable to control the aircraft 100 automatically and/or remotely (e.g., via a control signal received from a remote entity, such as a remote controller, a remote pilot or a remote-control tower). In various embodiments, the control system 107 can include one or more computers with one or more non-transitory computer readable medium storing instructions, and one or more processors configured to execute the instructions in order to perform the processing and control functions described herein.

For example, the control system 107 may control when the propulsion systems 101(A)-(L) should be operated, and/or the amount of power provided to the propulsion systems 101(A)-(L). The control system 107 may be configurable to control the propulsion systems 101(A)-(L) independently from one another. According to various embodiments, the control system 107 may control the propulsion systems 101(A)-(L) based on input received from a remote controller (e.g. remote pilot), input received from an autopilot, sensor data and/or flight data received from the sensors (e.g. sensors measuring air temperature, electric motor temperature, airspeed of the aircraft, etc.), computers, and other input/output devices coupled to the aircraft.

The flight control system 107 may also control one or more tilting mechanisms to switch the positioning of one or more tilting fans from the forward flight configuration to the vertical flight configuration, from the vertical flight configuration to the forward flight configuration, to one or more intermediary tilt angles, and/or to sweep through a range of tilt angles according to a flight plan or as needed. According to various embodiments, the control system (e.g., flight control system) may control the angles of the tilting fans based on sensor data and/or flight data received from the sensors (e.g., sensor measuring air temperature, electric motor temperature, airspeed of the aircraft, etc.), computers, and other input/output devices coupled to the aircraft.

The flight control system 107 may further control one or more pitching mechanisms to switch the positioning of one or more rotor blades between two or more pitch positions. According to various embodiments, the flight control system 107 may control the rotor blade pitch positions based on sensor data and/or flight data received from the sensors (e.g., sensor measuring air temperature, electric motor temperature, airspeed of the aircraft, etc.), computers, and other input/output devices coupled to the aircraft. The pitch of a rotor blade may be set based upon current flight stage and/or flight needs. For example, a first pitch, which may be a low pitch, may be chosen during times when the aircraft is accelerating (e.g., forward, or upward), hovering, taking off, and/or landing. A second pitch, which may be a high pitch, may be selected when the aircraft has reached cruise flight (e.g., having reached a predefined forward velocity).

As discussed above, in some embodiments, a pitching mechanism may be coupled to a tilting mechanism. In this case, the flight control system 107 may further control the tilting mechanisms and the pitching mechanism together, using one or more shared actuators, and according to a predefined relationship between tilt angles and pitch positions. The flight control system 107 may determine and adjust the tilt angle of a tilting fan and the pitch position of rotor blades based on a current flight stage and/or flight needs. The flight control system 107 may prioritize the tilt angle by selecting a most suitable tilt angle and allowing the pitching mechanism to passively be adjusted. A relationship between tilt angles and pitch positions may be pre-configured such that the corresponding pitch position will typically or always be suitable for the given tilt angle. In some embodiments, the flight control system 107 may prioritize the pitch position when the tilt angle is near to horizontal. For example, the flight control system 107 may be configured to select a third tilt angle that is slightly above horizontal in order to allow a lower pitch position (e.g., a third pitch position as discussed above) than a predefined pitch position (e.g., a second pitch position as discussed above) paired to a horizontal tilt angle.

Accordingly, the control system 107 may be configured to translate pilot or other operator input, and/or corrections computed by an onboard computer, into forces and moments and/or to further translate such forces and moments into a set of actuator (e.g., vertical lift rotors; propellers; control surfaces, such as ailerons; etc.) and/or associated parameters (e.g., lift fan power, tilt angle, rotor blade pitch, speed, or torque) to provide the required forces and moments. For example, pilot or other operator inputs may indicate a desired change in the aircraft's speed, direction, and/or orientation, and/or wind or other forces may act on the aircraft, requiring the propulsion systems and/or other actuators to be used to maintain a desired aircraft attitude (roll/pitch/yaw), speed, and/or altitude.

According to various embodiments, the control system 107 may be configurable to receive a flight instruction, such as a takeoff, hover, cruise, or landing instruction. The control system 107 may then determine the current location and/or velocity of the aircraft 100, and then control the operation of the propulsion systems 101(A)-(L) based on the flight instruction. During the operation of the aircraft 100, the control system 107 may be configurable to continuously monitor the operational states of the propulsion systems 101(A)-(L) in view of the flight instruction.

The aircraft 100 can further include landing gear 130. The landing gear 130 can include any suitable combination of one or more skids, wheels, skis, pontoons, shock absorbers, struts, and/or any other suitable component for supporting the aircraft 100 when landing and/or landed on the ground. In some embodiments, the landing gear 130 can be retractable into a compartment within the fuselage 104.

The aircraft 100 can include any other suitable control structures and control surfaces. Any suitable number of ailerons, rudders, elevators, slats, flaps, spoilers, and/or stabilizers can be included. For example, a horizontal stabilizer 140 (e.g., a tailplane) can be coupled to a rear end or tail of the fuselage 104. The horizontal stabilizer 140 may be in any suitable shape or form. For example, as shown in FIGS. 1A-1B, the horizontal stabilizer 140 may include two stabilizer surfaces protruding at horizontally from a tail. In some embodiments, each of the stabilizer surfaces can further include hinged control surfaces on the aft edges. Additionally, as shown in FIGS. 1A-1B, an additional (e.g., third) vertical stabilizer surface can be mounted on the tail, extending vertically upward and/or downward. Introducing the horizontal stabilizer 140 can provide additional stability and control of the aircraft 100. This can be especially useful during times when the vertical fans are disabled or otherwise not being utilized or relied on for control and stability (e.g., during cruising flight).

Flight Process

According to various embodiments, a control system may control flight of an aircraft configured for vertical takeoff and landing.

An aircraft may be in a stationary position on the ground. For example, the aircraft may be parked at a charging station for charging the batteries. Alternatively, the aircraft may be parked at a location awaiting to receive cargo or passengers. A flight control system of the aircraft may receive a flight plan (e.g., from the autopilot, a pilot or a remote controller pilot) to arrive at a predetermined destination. The flight plan may include an instruction to takeoff from the ground. The flight control system may control one or more of the propulsion systems to activate. For example, the thrust-producing components of the aircraft may be deactivated or in a standby mode. The flight control system may power up the propulsion systems from a deactivated mode so that they are ready to generate vertical lift.

The control system may operate a first set of one or more propulsion systems coupled to the aircraft. Each of the first set of one or more propulsion systems may have two or more rotor blades and a fixed vertical orientation or a tiltable orientation currently set to a vertical flight configuration.

For example, the flight control system may initiate a takeoff sequence to lift the aircraft off of the ground. The flight control system may operate the first set of one or more propulsion systems to provide vertical thrust so that the aircraft leaves the ground. The flight control system may continue operating the first set of one or more propulsion systems in this manner until a certain time has passed or a certain height is reached (e.g., a safe distance from a landing pad). The control system can continue to operate the first set of one or more propulsion systems during liftoff, hovering, landing, or any other suitable stage of flight to provide vertical thrust.

The control system may at some points control one or more of the first set of one or more propulsion systems, such as fixed vertical fans, to stop operating during other stages of flight, such as forward cruising flight when vertical lift may additionally and/or instead be provided by wings of the aircraft. For example, after a certain amount of time has passed and/or altitude gained, the flight control system may receive an instruction to transition to forward flight. Before switching to the forward flight mode, the control system may check one or more of the altitude, speed and orientation of the aircraft to ensure that the parameters are within a predetermined, desirable range. In some embodiments, the control system may communicate the parameters to a remote entity (e.g., a remote-control tower or a remote pilot).

The control system may operate a second set of one or more propulsion systems. Each of the second set of one or more propulsion systems have a fixed horizontal orientation or a tiltable orientation set to a forward flight configuration. Each of the second set of one or more propulsion systems may have two or more rotor blades. In some embodiments, one or more propulsion systems, such as tilting fans, may be included in both the first set of one or more propulsion systems and the second set of one or more propulsion systems.

For example, upon receiving the flight instruction to transition to forward flight, the control system may operate a second set of one or more propulsion systems to generate forward thrust for the aircraft. The flight control system can control the forward acceleration in any suitable manner, such as by may gradually increasing the power supplied to the second set of one or more propulsion systems so that the aircraft gradually gains forward velocity.

In some embodiments, the second set of one or more propulsion systems may activate and begin providing forward thrust while the aircraft is still in the process of gaining altitude from the vertical lift fans. As a result, forward travel can overlap with vertical lifting. Additionally, the flight control system can adjust power to the first set of one or more propulsion systems as required to maintain stability and altitude while the second set of one or more propulsion systems causes forward airspeed to increase.

In some embodiments, one or more of the first set of propulsion systems and/or the second set of one or more propulsion systems may be operated to tilt between a forward flight configuration and a vertical flight configuration. Such tilting propulsion systems may be operated during both one or more steps to provide vertical thrust and one or more steps to provide horizontal thrust.

In some embodiments, one or more tilting propulsion systems may be operated to gradually, iteratively, and/or continuously tilt from a vertical flight configuration to a forward flight configuration. When the tilting propulsion systems are set to one or more intermediary tilt angles, the thrust can be provided at an angle with a partial vertical component and a partial horizontal component. As the tilting propulsion systems tilt through one or more intermediary tilt angles, the horizontal thrust component increases and the vertical thrust component decreases. In some embodiments, the one or more tilting propulsion systems may be operated to pause movement and tilting at a predefined intermediary tilt angle (referred to as a third tilt angle, a critical tilt angle, or a threshold tilt angle) that may be near-horizontal but above horizontal, while continuing to operating the propulsion systems to provide thrust. Once a predefined speed and/or altitude are obtained, the one or more tilting propulsion systems may be operated to resume tilting progress until reaching the forward flight configuration.

The control system may set and/or modify a pitch position setting of one or more rotor blades of one or more propulsion systems (e.g., from the first set and/or the second set). In some embodiments, one or more rotor blades may be initially set to a first pitch position. The first pitch position can be maintained during one or more stages of flight, such as takeoff and/or forward acceleration. The control system may later adjust the one or more rotor blades to have a second pitch position. For example, once cruising flight is reached (e.g., after reaching a certain forward speed), the pitch setting can be changed to the second pitch position. In some embodiments, the pitch setting can be gradually and/or iteratively changed from the first pitch position to the second pitch position as forward velocity increases, and can be gradually changed from the second position to the first position as forward velocity decreases.

In some embodiments, a pitching mechanism for one or more rotor blades of a tilting propulsion system may be coupled to a tilting mechanism of the propulsion system. As the tilt angle changes (e.g., decreases), the pitching mechanism be configured to automatically change (e.g., increase) in response. In some embodiments, the control system may operate the propulsion system to pause tilting movement at a predefined intermediary tilt angle (referred to as a third tilt angle) that may be near-horizontal but above horizontal, such that a certain predefined pitch position (referred to as a third pitch position) that is coupled to the third tilt angle can be maintained while the aircraft continues gaining speed and/or altitude. Once a predefined speed and/or a predefined altitude are obtained, the one or more tilting propulsion systems may be operated to resume tilting progress until reaching the forward flight configuration, such that the pitch position can correspondingly by changed to a predefined pitch position (referred to as a second pitch position) that is coupled to the forward flight tilt configuration.

The control system can continue to operate the second set of one or more propulsion systems during forward cruising flight, forward acceleration, deceleration, or any other suitable stage of flight to provide horizontal thrust. The control system may at some points control the first set of one or more propulsion systems to stop operating during other stages of flight, such as liftoff, hovering, and/or landing. At some points in time, the control system can operate both the first set of one or more propulsion systems and the second set of one or more propulsion systems simultaneously.

Subsequently, the flight control system may deactivate one or more of the first set of one or more propulsion systems, or otherwise reduce power provided to the first set of one or more propulsion systems. For example, once the second set of one or more propulsion systems have generated a predetermined velocity so that the wings provide enough lift to maintain altitude, the first set of one or more propulsion systems may no longer be needed for vertical lift. Accordingly, one or more of the first set of one or more propulsion systems can be powered down, deactivated, placed in a standby mode, or be operated at a reduced power level during forward flight of the aircraft.

The control system may continue alternating between operating one or more of the first set of one or more propulsion systems and/or the second set of one or more propulsion systems, continue tilting one or more tilting propulsion systems, and/or continue adjusting the pitch position of one or more rotor blades (e.g., through adjusting a coupled tilt angle of a propulsion system).

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom" or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A system comprising:
a tiltable propulsion system configured to move between a first tilt angle and a second tilt angle, wherein the tiltable propulsion system includes a plurality of rotor blades each configured to move between a first pitch position and a second pitch position;
a tilting mechanism coupled to the tiltable propulsion system and configured to move the tiltable propulsion system between the first tilt angle and the second tilt angle;
a pitching mechanism coupled to one or more of the plurality of rotor blades and configured to move one or more of the plurality of rotor blades between the first pitch position and the second pitch position;
a coupling mechanism coupling the pitching mechanism and the tilting mechanism, wherein the coupling mechanism includes a four-bar crank slider, and the pitching mechanism includes a slider coupled to the four-bar crank slider; and
an actuator configured to operate the tilting mechanism and the pitching mechanism simultaneously.

2. The system of claim 1,
wherein the coupling mechanism is configured such that movement of the tiltable propulsion system by the tilting mechanism causes a corresponding movement of one or more of the plurality of rotor blades by the pitching mechanism.

3. The system of claim 2, wherein the coupling mechanism is configured such that each tilt angle of the tiltable propulsion system causes a pitch position for one or more of the plurality of rotor blades.

4. The system of claim 3, wherein the first tilt angle causes the first pitch position, and the second tilt angle causes the second pitch position.

5. The system of claim 1, wherein the pitching mechanism moves one or more of the plurality of rotor blades between the first pitch position and the second pitch position as the tilting mechanism moves the tiltable propulsion system between the first tilt angle and the second tilt angle.

6. The system of claim 2, wherein the coupling mechanism is configured to provide a non-linear relationship between a tilt angle of the tiltable propulsion system and a pitch position of one or more of the plurality of rotor blades.

7. The system of claim 6, wherein the non-linear relationship causes a first change in the pitch position of one or more of the plurality of rotor blades in response to change in the tilt angle when the tiltable propulsion system is set to the first tilt angle, and wherein the non-linear relationship causes a second change in the pitch position of one or more of the plurality of rotor blades in response to a change in the tilt angle when the tiltable propulsion system is set to the second tilt angle, wherein the second change is larger than the first change.

8. The system of claim 1,
wherein the coupling mechanism is configured to convert a tilting motion caused by the tilting mechanism into a linear motion at the pitching mechanism, and wherein the pitching mechanism is configured to convert the linear motion into a rotational motion at one or more of the plurality of rotor blades.

9. The system of claim 8, further comprising:
a support structure, the tiltable propulsion system being coupled to the support structure, wherein the coupling mechanism is connected to the support structure and the tiltable propulsion system.

10. The system of claim 9, wherein the coupling mechanism is indirectly connected to the tilting mechanism.

11. The system of claim 8, wherein the coupling mechanism includes a first pivot point that is offset from a second pivot point of the tilting mechanism.

12. The system of claim 1, wherein the actuator is a component of the tilting mechanism, and wherein the pitching mechanism is coupled to the tilting mechanism, the pitching mechanism operates without a separate dedicated actuator, the first tilt angle corresponds to a vertical flight configuration, and the second tilt angle corresponds to a forward flight configuration.

13. The system of claim 1, further comprising:
an aircraft including:
a fuselage;
a pair of wings coupled to opposite sides the fuselage;
one or more booms coupled to each one of the pair of wings; and
the tiltable propulsion system, wherein the tiltable propulsion system is coupled to a first boom of the one or more booms.

14. The system of claim 13, further comprising:
a control system configured to simultaneously control the tilting mechanism and the pitching mechanism through the actuator, and configured to:
operate the tilting mechanism to gradually move the tiltable propulsion system from the first tilt angle through a set of intermediary tilt angles to a third tilt angle;
operate the tilting mechanism to, upon reaching the third tilt angle, pause movement the tiltable propulsion system; and
after the aircraft reaches a predetermined speed or a predetermined altitude, operate the tilting mechanism to move the tiltable propulsion system from the third tilt angle to the second tilt angle.

15. The system of claim 14, wherein the first tilt angle corresponds to a vertical flight configuration, the second tilt angle corresponds to a forward flight configuration, and the third tilt angle is within 10 degrees of the second tilt angle.

16. The system of claim 14,
wherein the coupling mechanism is configured such that each tilt angle of the tiltable propulsion system causes a corresponding pitch position for one or more of the plurality of rotor blades, wherein the first tilt angle causes the first pitch position, the second tilt angle causes the second pitch position, the third tilt angle causes a third pitch position, wherein the third pitch position is at least 3 degrees less than the second pitch position.

17. The system of claim 16, wherein the control system is further configured to:
operate the pitching mechanism to move one or more of the plurality of rotor blades from the third pitch position to the second pitch position.

18. The system of claim 17, wherein operating the pitching mechanism to move one or more of the plurality of rotor blades from the third pitch position to the second pitch position is performed indirectly by operating the tilting mechanism to move the tiltable propulsion system from the third tilt angle to the second tilt angle.

19. The system of claim 1, wherein the first pitch position corresponds to an acceleration pitch, and the second pitch position corresponds to an efficiency pitch.

* * * * *